United States Patent
Labeque et al.

(10) Patent No.: US 10,619,042 B2
(45) Date of Patent: *Apr. 14, 2020

(54) POUCHES HAVING WATER-SOLUBLE FILMS MADE FROM POLYVINYL ALCOHOL POLYMER BLENDS, AND RELATED METHODS

(71) Applicant: The Procter & Gamble Company, Cincinnati, OH (US)

(72) Inventors: Regine Labeque, Neder-Over-Heembeek (BE); Florence Catherine Courchay, Brussels (BE); Steven George Friedrich, Crown Point, IN (US); Shinsuke Nii, Schaumburg, IL (US); David M Lee, Crown Point, IN (US); Marc Rene Bert Renmans, Strombeek-Bever (BE)

(73) Assignee: The Procter & Gamble Company, Cincinnati, OH (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/486,613

(22) Filed: Apr. 13, 2017

(65) Prior Publication Data

US 2017/0298216 A1    Oct. 19, 2017

Related U.S. Application Data

(60) Provisional application No. 62/321,959, filed on Apr. 13, 2016.

(51) Int. Cl.
*C11D 17/04* (2006.01)
*C11D 3/37* (2006.01)
(Continued)

(52) U.S. Cl.
CPC ............. *C08L 29/04* (2013.01); *B65B 1/02* (2013.01); *B65B 1/04* (2013.01); *B65B 7/02* (2013.01);
(Continued)

(58) Field of Classification Search
None
See application file for complete search history.

(56) References Cited

U.S. PATENT DOCUMENTS

| | | |
|---|---|---|
| 5,362,532 A | 11/1994 | Famili et al. |
| 9,133,329 B2 | 9/2015 | Denome |

(Continued)

FOREIGN PATENT DOCUMENTS

| | | |
|---|---|---|
| JP | 04164998 A | 6/1992 |
| WO | WO 2014/026856 A1 * | 2/2014 |

(Continued)

OTHER PUBLICATIONS

PCT International Search Report for application No. PCT/US2017/027409, dated Aug. 24, 2017, 14 pages.

(Continued)

*Primary Examiner* — Lorna M Douyon
(74) *Attorney, Agent, or Firm* — Gregog S. Barley-Emerson

(57) ABSTRACT

Pouches that include a water-soluble film and a composition at least partially enclosed by the water-soluble film in at least one compartment, where the water-soluble film includes a polyvinyl alcohol (PVOH) resin blend. Methods of making and using such pouches and films.

27 Claims, 2 Drawing Sheets

(51) Int. Cl.
*B65D 65/46* (2006.01)
*B65D 81/32* (2006.01)
*D06L 1/00* (2017.01)
*B08B 9/20* (2006.01)
*C08L 29/04* (2006.01)
*C08K 5/053* (2006.01)
*B65B 1/02* (2006.01)
*B65B 1/04* (2006.01)
*B65B 7/02* (2006.01)
*B65B 9/04* (2006.01)
*B65B 47/02* (2006.01)
*C08J 5/18* (2006.01)
*C11D 3/32* (2006.01)

(52) U.S. Cl.
CPC .............. *B65B 9/042* (2013.01); *B65B 47/02* (2013.01); *B65D 65/46* (2013.01); *B65D 81/3261* (2013.01); *C08J 5/18* (2013.01); *C08K 5/053* (2013.01); *C11D 3/32* (2013.01); *C11D 3/3753* (2013.01); *C11D 17/042* (2013.01); *C11D 17/045* (2013.01); *C08J 2329/04* (2013.01); *C08L 2205/025* (2013.01)

(56) References Cited

U.S. PATENT DOCUMENTS

| | | | |
|---|---|---|---|
| 2009/0291282 A1* | 11/2009 | Kitamura | C08J 5/18 428/220 |
| 2009/0312220 A1* | 12/2009 | Boutoille | C11D 3/40 510/277 |
| 2015/0093526 A1 | 4/2015 | Denome et al. | |
| 2015/0158646 A1* | 6/2015 | Meier | B65D 65/46 206/524.7 |
| 2015/0275152 A1 | 10/2015 | Brooker | |
| 2016/0024446 A1 | 1/2016 | Lee et al. | |
| 2016/0102278 A1* | 4/2016 | Labeque | C11D 17/042 510/296 |
| 2016/0102279 A1 | 4/2016 | Labeque | |
| 2017/0218146 A1* | 8/2017 | Childers | B29C 51/002 |
| 2017/0226298 A1 | 8/2017 | Friedrich | |
| 2017/0226338 A1 | 8/2017 | Friedrich | |
| 2017/0233539 A1 | 8/2017 | Friedrich | |
| 2017/0298308 A1 | 10/2017 | Labeque | |

FOREIGN PATENT DOCUMENTS

| | | |
|---|---|---|
| WO | WO2017180883 A1 | 10/2017 |
| WO | WO2017180888 A1 | 10/2017 |

OTHER PUBLICATIONS

U.S. Appl. No. 15/486,669, filed Apr. 13, 2017, Regine Labeque, et al.

PCT International Search Report for Application No. PCT/US2017/027414, dated Jul. 19, 2017, 15 pages.

U.S. Appl. No. 62/063,086, filed Oct. 13, 2014, Regine Labeque, et al.

* cited by examiner

POUCHES HAVING WATER-SOLUBLE FILMS MADE FROM POLYVINYL ALCOHOL POLYMER BLENDS, AND RELATED METHODS

FIELD OF THE INVENTION

The present disclosure relates to pouches that include a water-soluble film and a composition at least partially enclosed by the water-soluble film in at least one compartment, where the water-soluble film includes a polyvinyl alcohol (PVOH) resin blend. The present disclosure further relates to methods of making and using such pouches.

BACKGROUND OF THE INVENTION

Water-soluble polymeric films are commonly used as packaging materials to simplify dispersing, pouring, dissolving and dosing of a material to be delivered. For example, packets made from water-soluble film are commonly used to package household care compositions, e.g., a pouch containing a laundry or dish detergent. A consumer can directly add the pouch to a mixing vessel, such as a bucket, sink or washing machine. Advantageously, this provides for accurate dosing while eliminating the need for the consumer to measure the composition. The pouch may also reduce mess that would be associated with dispensing a similar composition from a vessel, such as pouring a liquid laundry detergent from a bottle. The pouch also insulates the composition therein from contact with the user's hands. In sum, soluble polymeric film packets containing pre-measured agents provide for convenience of consumer use in a variety of applications.

Some water-soluble polymeric films that are used to make pouches will incompletely dissolve during a wash cycle, leaving film residue on items within the wash. Such problems may particularly arise when the pouch is used under stressed wash conditions, such as when the pouch is used in cold water (e.g., water as low as 5° C. and/or up to 10° C. or 15° C.), in a short wash cycle, and/or in a low-water wash cycle (e.g., wash liquors from about 3 L to about 20 L). Notably, environmental concerns and energy cost are driving consumer desire for utilizing colder wash water and shorter wash cycles.

Additionally, the pouch must have adequate strength, both after soon after making and upon storage, to withstand forces that may be applied during packing, transport, storage, and usage. Adequate strength may be particularly preferred with the pouches encapsulate liquid compositions, such as laundry detergent, to avoid unintentional bursting and/or leakage.

There remains a need for water-soluble films and related articles such as pouches having the desired characteristics of good water solubility (e.g., cold water solubility), suitable pouch strength, chemical resistance, chemical and physical compatibility with laundry actives or other compositions in contact with the film or pouch formed therefrom, and/or desirable mechanical properties, such as deformability upon thermoforming and/or adequate sealing.

SUMMARY OF THE INVENTION

The present disclosure relates to pouches that include a water-soluble film and a composition at least partially enclosed by the water-soluble film. The water-soluble film includes a preferred polyvinyl alcohol (PVOH) resin blend, as described herein. The present disclosure also relates to methods of making and using such pouches.

BRIEF DESCRIPTION OF THE DRAWINGS

The figures herein are illustrative in nature and are not intended to be limiting.

DETAILED DESCRIPTION OF THE INVENTION

Figure 1:
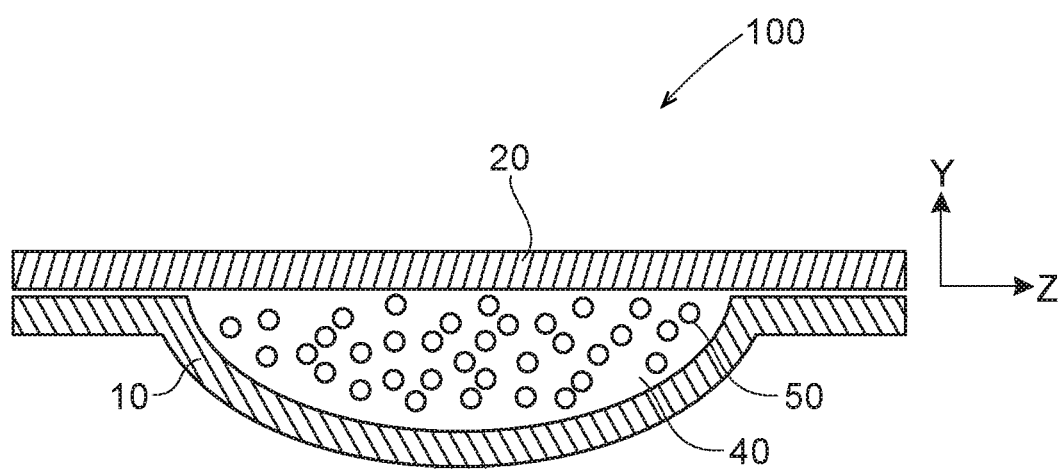
FIG. 1 shows a side cross-sectional view of a pouch.

The present disclosure relates to pouches made from a water-soluble film, where the water-soluble film at least partially encloses a composition in at least one compartment, and where the film includes a PVOH resin blend.

Specifically contemplated examples of the present disclosure are described in the following numbered paragraphs. These examples are intended to be illustrative in nature and are not intended to be limiting.

1. A pouch comprising a water-soluble film and a household care composition at least partially enclosed by the water-soluble film in at least one compartment, the water-soluble film comprising a polyvinyl alcohol (PVOH) resin blend comprising: a first PVOH polymer comprising carboxylated anionic monomer units, vinyl alcohol monomer units and optionally vinyl acetate monomer units, wherein the carboxylated anionic monomer unit is present in the first PVOH polymer in an amount of from about 3 mol. % to about 6 mol. %, a second PVOH polymer consisting essentially of vinyl alcohol monomer units and optionally vinyl acetate monomer units, wherein the first PVOH polymer is present in an amount in a range from about 10 wt. % to about 70 wt. % of total PVOH polymers in the film.

2. A pouch according to paragraph 1, wherein the PVOH resin blend is present in the water-soluble film in an amount in a range of about 50 wt. % to about 95 wt. %, or from about 50% to about 80%, more preferably from about 60% to about 75%, by weight of the film.

3. A pouch according to any of paragraphs 1-2, wherein the carboxylated anionic monomer unit is derived from a member selected from the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations thereof.

4. A pouch according to any of paragraphs 1-3, wherein the carboxylated anionic monomer unit is derived from a member selected from maleic acid, monoalkyl maleate, dialkyl maleate, maleic anyhydride, and combinations thereof.

5. A pouch according any of paragraphs 1-4, wherein the carboxylated anionic monomer unit is derived from a monoalkyl maleate unit selected from the group consisting of monomethyl maleate, salts, preferably alkali metal salts, thereof, and combinations thereof.

6. A pouch according to any of paragraphs 1-5, wherein the carboxylated anionic monomer unit is present in the first PVOH polymer in an amount of from about 3 mol. % to about 5 mol. %, or from about 3.5 mol. % to about 4.5 mol. %, or from about 4 mol. % to about 4.5 mol. %.

7. A pouch according to any of paragraphs 1-6, wherein the carboxylated anionic monomer is present in an amount in a range of from about 0.5 mol % to about 3 mol % of total PVOH polymer in the film.

8. A pouch according to any of paragraphs 1-7, wherein the first PVOH polymer is present in an amount in a range from about 10 wt. % to about 60 wt. %, preferably from about 20 wt. % to about 50 wt. %, more preferably from about 30 wt. % to about 40 wt. %, of total PVOH polymers in the film.

9. A pouch according to any of paragraphs 1-8, wherein the first PVOH polymer is characterized by a 4% solution viscosity at 20° C. ($\mu_1$) of from about 10 cP to about 40 cP, or from about 10 cP to about 30 cP, or from about 12 cP to about 25 cP, or from about 14 cP to about 20 cP.

10. A pouch according to any of paragraphs 1-9, wherein the first PVOH polymer is characterized by a degree of hydrolysis of 60% to about 99%, preferably from about 80% to about 98%, preferably from about 83% to about 95%, preferably from about 85% to about 92%.

11. A pouch according to any of paragraphs 1-10, wherein the second PVOH polymer is characterized by a degree of hydrolysis of from about 60% to about 99%, preferably from about 80% to about 98%, preferably from about 85% to about 95%, preferably from about 87% to about 92%.

12. A pouch according to any of paragraphs 1-11, wherein the second PVOH polymer is characterized by a 4% solution viscosity at 20° C. ($\mu_2$) from about from about 3.0 cP to about 40 cP or to about 30 cP, or from about 7 to about 40 cP or to about 30 cP, 10 cP to about 40 cP, or from about 10 cP to about 30 cP, or from about 12 cP to about 25 cP.

13. A pouch according to any of paragraphs 1-12, wherein the first PVOH polymer is characterized by a 4% solution viscosity at 20° C. ($\mu_1$), and wherein an absolute viscosity difference $|\mu_2 - \mu_1|$ for the first PVOH polymer and the second PVOH polymer is in a range of 0 cP to about 10 cP.

14. A pouch according to any of paragraphs 1-13, wherein the second PVOH polymer is present in an amount in a range from about 30 wt. % to about 90 wt. % of total PVOH polymers in the film, or from about 40 wt. % to about 90 wt. %, or from about 50 wt. % to about 90 wt. %, or from about 50 wt % to about 80 wt. %, or from about 60 wt. % to about 70 wt. %.

15. A pouch according to any of paragraphs 1-14, wherein the PVOH resin blend comprises a third PVOH polymer.

16. A pouch according to any of paragraphs 1-15, wherein the water-soluble film further comprises at least a third water-soluble polymer which is other than a PVOH polymer.

17. A pouch according to any of paragraphs 1-16, wherein third water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, blends thereof, and combinations thereof.

18. A pouch according to any of paragraphs 1-17, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

19. A pouch according to any of paragraphs 1-18, wherein the water-soluble film further comprises one or more plasticizers in an amount in a range of about 1 wt. % to about 40 wt. % of the film.

20. A pouch according to any of paragraphs 1-19, wherein the film comprises an aversive agent, preferably a bittering agent, more preferably denatonium benzoate and/or a derivative thereof.

21. A pouch according to any of paragraphs 1-20, wherein the film has an undeformed thickness of from about 5 to about 200 μm, or from about 20 to about 100 μm, or from about 40 to about 85 μm, or about 76 μm.

22. A pouch according to any of paragraphs 1-21, wherein the pouch further comprises at least two compartments, or at least three compartments.

23. A pouch according to any of paragraphs 1-22, wherein a second compartment is superposed on a first compartment.

24. A pouch according to any of paragraphs 1-23, wherein the household care composition is selected from the group consisting of light duty liquid detergents compositions, heavy duty liquid detergent compositions, hard surface cleaning compositions, laundry detergent gels, bleaching compositions, laundry additives, fabric enhancer compositions, shampoos, body washes, other personal care compositions, and mixtures thereof.

25. A pouch according to any of paragraphs 1-24, wherein the composition is in the form of a liquid.

26. A pouch comprising a water-soluble film and a household care composition at least partially enclosed by the water-soluble film in at least one compartment, the water-soluble film comprising a polyvinyl alcohol (PVOH) resin blend comprising: a first PVOH polymer comprising carboxylated anionic monomer units, vinyl alcohol monomer units and optionally vinyl acetate monomer units, wherein the first PVOH polymer is present in an amount in a range from about 10 wt. % to about 50 wt. % of total PVOH polymers in the film, wherein the carboxylated anionic monomer unit is present in the film in an amount in a range of from about 0.5 mol % to about 3 mol % of total PVOH polymer in the film, and a second PVOH polymer consisting essentially of vinyl alcohol monomer units and optionally vinyl acetate monomer units.

27. A pouch according to paragraph 26, wherein the carboxylated anionic monomer unit is derived from a member selected from the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, alkali metal salts of the foregoing, esters of the foregoing, and combinations thereof.

29. A pouch according to any of paragraphs 26-28, wherein the composition is a liquid.

30. A pouch according to any of paragraphs 26-29, wherein the household care composition is selected from the group consisting of light duty liquid detergents compositions, heavy duty liquid detergent compositions, hard surface cleaning compositions, laundry detergent gels commonly used for laundry, bleaching compositions, laundry additives, fabric enhancer compositions, shampoos, body washes, other personal care compositions, and mixtures thereof.

31. A method of forming a pouch according to any of paragraphs 1-30, the method comprising the steps of: providing the water-soluble film; shaping the film to form an open compartment; providing the composition to the open compartment; sealing the open compartment, optionally with a second film, to form a pouch having a sealed compartment having the composition enclosed therein.

32. A method according to paragraph 31, wherein the open compartment is sealed with at least a second sealed compartment, so that the pouch formed by the method is a multi-compartment pouch having superposed compartments.

33. A method of treating a substrate, where the method includes the step of contacting the substrate with the composition of the pouch according to any of paragraphs 1-30 in the presence of water.

34. A method according to paragraph 33, where the method includes the steps of combining the pouch with water, allowing for at least some of the film of the pouch to dissolve in the presence of water, diluting the composition contained therein 300-800 fold with water to form a wash liquor, and/or contacting the substrate, preferably a fabric, with the wash liquor; the substrate, preferably the fabric to be treated, may comprise one or more stains.

35. A use of a film according to any of paragraphs 1-33 to provide a pouch comprising a household composition, where the pouch exhibits improved cold-water solubility.

The pouches, films, compositions, methods, and uses are described in more detail below.

Some water-soluble polymeric films that are used to make articles such as pouches (e.g., that can contain a household care composition therein) will incompletely dissolve in water during normal use, for example during a laundry wash cycle for packets containing a laundry-related composition (e.g., thereby leaving film residue on items within the wash).

Water-soluble polymeric films based on PVOH can be subject to changes in solubility characteristics. The acetate group in the co-poly(vinyl acetate vinyl alcohol) polymer is known by those skilled in the art to be hydrolyzable by either acid or alkaline hydrolysis. As the degree of hydrolysis increases, a polymer composition made from the PVOH homopolymer resin will have increased mechanical strength but reduced solubility at lower temperatures (e.g., requiring hot water temperatures for complete dissolution). Accordingly, exposure of a PVOH homopolymer resin to an alkaline environment (e.g., resulting from a laundry bleaching additive) can transform the resin from one which dissolves rapidly and entirely in a given aqueous environment (e.g., a cold water medium) to one which dissolves slowly and/or incompletely in the aqueous environment, potentially resulting in undissolved polymeric residue at the end of a wash cycle. This is an inherent weakness in the application of films based on just the vinyl acetate/alcohol co-polymer typified by commercial PVOH homopolymer resins.

PVOH copolymer resins with pendant carboxyl groups, such as vinyl alcohol/hydrolyzed methyl acrylate sodium salt resins, can form lactone rings between neighboring pendant carboxyl and alcohol groups, thus reducing the water solubility of the PVOH copolymer resin. In the presence of a strong base such as a laundry bleaching additive, the lactone rings can open over the course of several weeks at relatively warm (ambient) and high humidity conditions (e.g., via lactone ring-opening reactions to form the corresponding pendant carboxyl and alcohol groups with increased water solubility). Thus, contrary to the effect observed with PVOH homopolymer films, it is believed that such a PVOH copolymer film can become more soluble due to chemical interactions between the film and an alkaline composition inside the pouch during storage. Consequently, as they age, the packets may become increasingly prone to premature dissolution during wet or humid storage conditions or accidental water exposure, leading to decreased pouch strength and/or a decrease in efficacy of certain laundry actives due to the presence of the bleaching agent and the resulting pH influence. Alternatively, when contacting the film with an about neutral pH formulation, e.g. pH 7 to 8, the amount of lactone rings might increase, potentially rendering the pouch relatively insoluble.

Additionally, it is desirable for PVOH water-soluble that are to be formed into pouches to have sufficient plasticity to ensure good deformability upon thermoforming and sealability, but also sufficient crystallinity to secure good pouch strength. It is desirable to find a good balance between the seemingly opposing characteristics.

At least some or all of the problems described herein can be addressed by providing pouches that include films having a carefully selected PVOH resin blend. In particular, it has been found that careful selection of the identity and amount of an anionic monomer unit in an anionic copolymer, as well as total amount of that anionic copolymer in the PVOH resin blend by weight of the total PVOH resin in the film provides films and pouches that have particularly desirable characteristics.

The present disclosure relates to pouches comprising water-soluble film including a polyvinyl alcohol (PVOH) resin blend and optionally one or more additional components such as plasticizers, fillers, surfactants, and other additives as described in more detail below. The pouches may contain, for example, a composition, such as a household care composition. The components of the compositions and processes of the present disclosure are described in more detail below.

Definitions

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

The pouches of the present disclosure may contain a composition, for example a household care composition. The composition can be selected from a liquid, solid or combination thereof. As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer" or "PVOH polymer") further includes copolymers having a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units.

As used herein, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of PVOH, the term "copolymer" (or "PVOH copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a PVOH copolymer can include a copolymer having vinyl alcohol units and one or more other monomer units, but no vinyl acetate units.

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble polymer (or resin; whether PVOH or otherwise) in the water-soluble film.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Pouches

The present disclosure relates to pouches. The pouches may include the water-soluble films described herein. The film may be formed into a compartment, which may at least partially or completely enclose a composition.

The pouches typically include at least one sealed compartment. The pouches may comprise a single compartment or multiple compartments, such as at least two compartments or at least three compartments.

FIG. 1 illustrates an article in which a water-soluble pouch 100 is formed from water-soluble polymer films 10, 20 sealed at an interface 30. One or both of the films 10, 20 include the PVOH resin blend of the first PVOH polymer and the second PVOH polymer according to the present disclosure. The films 10, 20 define an interior pouch container volume 40 which contains any desired composition 50 for release into an aqueous environment. The composition 50 is not particularly limited, for example including any of the variety of cleaning compositions described below.

In examples comprising multiple compartments, each compartment may contain identical and/or different compositions. In turn, the compositions may take any suitable form including, but not limited to liquid, solid and combinations thereof (e.g. a solid suspended in a liquid). The pouches may comprise a first, second and third compartment, each of which respectively contains a different first, second, and third composition.

The compartments of multi-compartment pouches may be of the same or different size(s) and/or volume(s). The compartments of the present multi-compartment pouches can be separate or conjoined in any suitable manner. The second and/or third and/or subsequent compartments may be superimposed on the first compartment. The third compartment may be superimposed on the second compartment, which may in turn be superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. The first compartment may be surrounded by at least the second compartment, for example in a tire-and-rim configuration, or in a pouch-in-a-pouch configuration.

Multi-compartment pouches may comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. The second and optionally third compartment may each have a different geometry and shape as compared to the first compartment. The second and optionally third compartments may be arranged in a design on the first compartment. The design may be decorative, educative, or illustrative, for example to illustrate a concept or instruction, and/or used to indicate origin of the product. The first compartment may be the largest compartment having two large faces sealed around the perimeter, and the second compartment is smaller covering less than about 75%, or less than about 50% of the surface area of one face of the first compartment. When there is a third compartment, the aforementioned structure may be the same but the second and third compartments cover less than about 60%, or less than about 50%, or less than about 45% of the surface area of one face of the first compartment.

Figure 2:
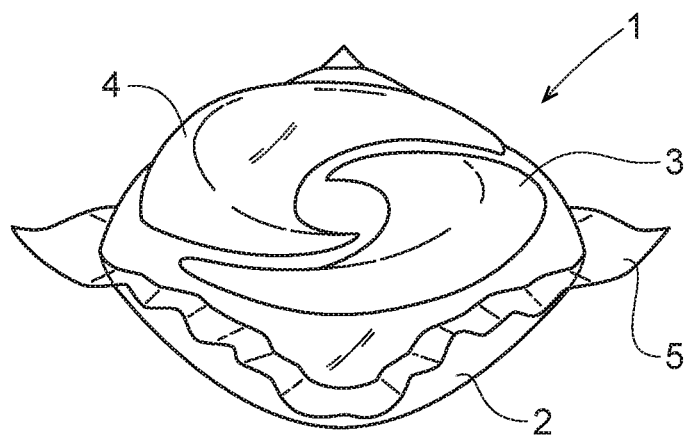
FIG. 2 shows a multi-compartment pouch.

FIG. 2 illustrates an article in which a water-soluble multi-compartment pouch 1 is formed from water-soluble film 5. The pouch 1 has three compartments; two smaller compartments 3, 4 are superposed on a larger bottom compartment 2.

The articles, pouches, and/or packets of the present disclosure may comprise one or more different films. For example, when the pouch includes a single compartment, the pouch may be made from one wall that is folded onto itself and sealed at the edges, or alternatively, two walls that are sealed together at the edges. When the pouch includes multiple compartments, the pouch may be made from one or more films such that any given packet compartment may comprise walls made from a single film or multiple films having differing compositions. A multi-compartment pouch may comprise at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Articles such as pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which articles such as packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and the mold sizes are adjusted accordingly.

The pouch may comprise a first and a second sealed compartment. The second compartment may be in a generally superposed relationship with the first sealed compartment such that the second sealed compartment and the first sealed compartment share a partitioning wall interior to the pouch.

The pouch may comprise a first and a second compartment further comprises a third sealed compartment. The third sealed compartment is in a generally superposed relationship with the first sealed compartment such that the third sealed compartment and the first sealed compartment share a partitioning wall interior to the pouch.

The first composition and the second composition may be selected from one of the following combinations: liquid, liquid; liquid, powder; powder, powder; and powder, liquid. The first, second and third compositions may be selected from one of the following combinations: solid, liquid, liquid; liquid, liquid, liquid; liquid, solid, liquid; solid, solid, liquid; solid, solid, solid.

The single compartment or plurality of sealed compartments may contain a composition. The plurality of compartments may each contain the same or a different composition. The composition may be in a form selected from a liquid, solid, or combination thereof. The composition may be in the form of a liquid, solid, a powder, beads, or mixtures thereof.

The composition may be a household care composition, for example a household care composition selected from the group of light duty liquid detergents compositions, heavy duty liquid detergent compositions, hard surface cleaning compositions including hand dishwashing and automatic dishwashing compositions, detergent gels commonly used for laundry, bleaching compositions, laundry additives, fabric enhancer compositions, shampoos, body washes, other personal care compositions, and mixtures thereof.

Water-Soluble Film

The pouches of the present disclosure include water-soluble film. The water-soluble film includes a polyvinyl alcohol (PVOH) resin blend. The PVOH resin blend includes two or more PVOH polymers, preferably two PVOH polymers. The components of the film are discussed in more detail below.

Polyvinyl Alcohol Polymers

The water-soluble film includes polyvinyl alcohol (PVOH) polymers. More specifically, films of the present disclosure include PVOH homopolymers (e.g., including substantially only vinyl alcohol units and optionally vinyl acetate monomer units) and PVOH copolymers (e.g., including one or more other monomer units in addition to vinyl alcohol and optionally vinyl acetate units).

PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold or hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis (DH) of the PVOH polymers included in the water-soluble films of the present disclosure may be in a range of about 75% to about 99% (e.g., about 79% to about 92%, about 86.5% to about 89%, or about 88%, such as for cold-water soluble compositions; about 90% to about 99%, about 92% to about 99%, or about 95% to about 99%). As the degree of hydrolysis is reduced, a film made from the resin will have reduced mechanical strength but faster solubility at temperatures below about 20° C. As the degree of hydrolysis increases, a film made from the polymer will tend to be mechanically stronger, and the thermoformability and dissolution, especially at colder wash temperatures, will tend to decrease.

The degree of hydrolysis of the PVOH may be chosen such that the water-solubility of the polymer is temperature dependent, and thus the solubility of a film made from the polymer, any compatibilizer polymer, and additional ingredients is also influenced. In one option the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%, or in a range of from about 87% to about 90%. In another option the film is hot water-soluble. A hot water-soluble film, soluble in water at a temperature of at least about 60° C., can include PVOH with a degree of hydrolysis of at least about 98%.

The water-soluble polymers (e.g., the PVOH resin blend alone or in combination with other water-soluble polymers) can be included in the film in an amount in a range of from about 50 wt. %, or about 60 wt. %, and/or to about 70 wt. %, or about 80 wt. %, or about 90 wt. %, or about 95 wt. %. For example, the PVOH resin blend may be present in the water-soluble film in an amount in a range of about 50 wt. %, about 60 wt. %, and/or to about 70 wt. %, or about 80 wt. %, or about 90 wt. %, or about 95 wt. %, by weight of the film. Preferably the resin blend is present in the film from about 50% to about 80%, more preferably from about 60% to about 75%.

The weight ratio of the amount of all water-soluble polymers as compared to the combined amount of all plasticizers (including water), compatibilizing agents, and secondary additives can be in a range of from about 0.5 to about 18, about 0.5 to about 15, about 0.5 to about 9, about 0.5 to about 5, about 1 to 3, or about 1 to 2, for example. Preferably this ratio is from about 1 to about 3, more preferably from about 1.3 to about 2.5. The specific amounts of plasticizers and other non-polymer component can be selected in a particular embodiment based on an intended application of the water-soluble film to adjust film flexibility and to impart processing benefits in view of desired mechanical film properties.

The PVOH resin blend includes a first PVOH resin that is a PVOH polymer ("first PVOH polymer") including one or more types of anionic monomer units (e.g., a PVOH ter- (or higher co-) polymer), preferably one type of anionic monomer unit. The PVOH resin blend includes a second PVOH resin that is a PVOH polymer ("second PVOH polymer") that consists essentially of vinyl alcohol monomer units and (optionally) vinyl acetate monomer units (e.g., a PVOH homopolymer which is either completely hydrolyzed polyvinyl alcohol or a partially hydrolyzed combination of poly(vinyl alcohol-co-vinyl acetate). Preferably, the PVOH resin blend includes only the first PVOH copolymer and the second PVOH polymer (e.g., a binary blend of the two polymers). Alternatively or additionally, the PVOH resin blend, the water-soluble film, or both can be characterized as being free or substantially free from other polymers (e.g., other water-soluble polymers generally, other PVOH-based polymers specifically, or both). The water-soluble film may include one or more additional water-soluble polymers. For example, the PVOH resin blend may include a third PVOH polymer, a fourth PVOH polymer, a fifth PVOH polymer, etc. (e.g., one or more additional PVOH homopolymers or PVOH copolymers, with or without anionic monomer units). For example, the water-soluble film may include at least a third (or fourth, fifth, etc.) water-soluble polymer which is other than a PVOH polymer (e.g., other than PVOH homopolymers or PVOH copolymers, with or without anionic monomer units).

The PVOH resin blend includes a first PVOH polymer. The first PVOH polymer includes an anionic monomer unit. The first PVOH polymer may be a PVOH terpolymer including vinyl alcohol monomer units, vinyl acetate monomer units (i.e., when not completely hydrolyzed), and a single type of anionic monomer unit (e.g., a where a single type of monomer unit can include equivalent acid forms, salt forms, and optionally residual ester forms of the anionic monomer unit). The PVOH copolymer can include two or more types of anionic monomer units. Preferably, the PVOH copolymer includes a single type of anionic monomer unit.

The anionic monomer unit in the first PVOH polymer may be derived from a carboxylated anionic monomer unit. As used herein, a "carboxylated anionic monomer unit" includes the vinyl polymerization units corresponding to monocarboxylic acid vinyl monomers, their esters and anhydrides, dicarboxylic monomers having a polymerizable double bond, their esters and anhydrides, and salts, preferably alkali metal salts, of any of the foregoing.

It has been surprisingly found that anionic polymers having carboxylated monomers, such as monomaleate units, provide particular benefits compared to other anionic polymers, such as those that contain sulphonated monomers such as acrylamido methylpropanesulfonate. Without wishing to be bound by theory, it is believed that carboxylated monomers, such as monomaleate units, deliver the right balance of sufficiently disrupting the polymer packing hence crystallinity of the film to enable good film dissolution, while not over-disrupting polymer packing and the resulting crystallinity of the film to still secure good pouch strength.

Examples of suitable anionic monomer units include the vinyl polymerization units corresponding to vinyl anionic monomers including vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). The carboxylated anionic monomer unit may be selected from maleic acid, monoalkyl maleate, dialkyl maleate, maleic anhydride, and combinations thereof. Preferably, the carboxylated anionic monomer unit is a monoalkyl maleate monomer unit. The monoalkyl maleate monomer unit preferably is selected from the group consisting of monomethyl maleate, alkali metals salts thereof (e.g., sodium salts), and combinations thereof. Preferably the monoalkyl maleate monomer is monomethyl maleate.

The one or more anionic monomer units may be incorporated or present in the first PVOH polymer at a given amount. Typically, as anionic monomer content increases, so does solubility of the PVOH polymer resin, resin blends, and/or films made from such resins or resin blends. Films that include PVOH polymers having higher anionic monomer contents also may have relatively greater tackiness, which may be indicative of greater sealability. However, a water soluble film where the relative tackiness is too high may not be desired due to challenges converting tacky films into pouches.

The amount of anionic monomer units may be characterized in terms of the molar content (expressed, e.g., as mol. %) of the anionic monomer units in the first PVOH polymer. The one or more anionic monomer units may be present in the first PVOH polymer in an amount in a range of from about 3 mol. % to about 6 mol. %, or from about 3 mol. % to about 5 mol. %, or from about 3.5 mol. % to about 4.5 mol. %, or from about 4 mol. % to about 4.5 mol. %, individually or collectively. The anionic monomer unit(s) may be present in the first PVOH polymer in an amount of at least about 3.0, 3.5, of 4.0 mol. %, and/or up to about 6.0, 5.5, 5.0, or 4.5 mol. %.

Alternatively or additionally, the anionic monomer unit(s) may be characterized in terms of the anionic monomer units present in the PVOH film, for example as molar content (mol. %) of the anionic monomer units compared to the total amount of PVOH polymer in the film (e.g., total of PVOH polymer, including homopolymer(s) and copolymer(s), in the PVOH resin blend). The anionic monomer unit(s) may be present in the water-soluble film in an amount in the range of from about 0.5 mol. % to about 3 mol. % of total PVOH polymer in the film. The anionic monomer unit(s) may be present in the film in an amount of at least about 0.5, 0.75, 1.0, or 1.2 mol. %, and/or up to about 3.0, 2.5, 2.0, or 1.7 mol. %, of total PVOH polymer in the film. For example, a first PVOH polymer that includes (carboxylated) anionic monomer units may be blended with a second PVOH polymer, such as a homopolymer, in about a 20 wt %/80 wt % blend to about an 80 wt %/20 wt % blend to achieve an average blend anionic monomer unit content of from about 0.5 mol. % to about 3 mol. % of total PVOH polymer. The foregoing anionic monomer unit content alternatively or additionally may also apply relative to total water-soluble polymer content in film, PVOH or otherwise.

The solvent for the saponification of polyvinyl acetate to polyvinyl alcohol is typically methanol which can remain in the resulting PVOH powder, even after drying. Upon dissolving the PVOH, the methanol is released into the atmosphere. Thus, it is desirable to reduce the methanol content remaining in the PVOH powder to less than 3 wt. %, or even less than 1 wt. %. Methods to remove volatile organic compounds include supplying a water-containing gas during the drying step, to replace the volatile organic compounds with water in the PVOH polymers. However, PVOH modified with monoesters, diesters, or anhydrides of ethylenically unsaturated dicarboxylic acids have a high affinity for water and the use of water-gas results in the dissolution of the surface of the powder particles and agglomeration of particles which makes processing the PVOH difficult. Alternatively, prolonged heating at high temperatures has been used to remove residual methanol. However, such high temperatures promote crosslinking between the PVOH hydroxyl moiety and the monoester, diester, and/or anhydride unit, resulting in insoluble components.

To reduce the amount of residual methanol in PVOH copolymers, the saponified copolymer is washed in a methanol/methyl acetate mixture having a methyl acetate content of about 45 vol. % or more, 60 vol. % or more, or 70 vol. % or more. For example, the PVOH gel obtained after the saponification step may be triturated with methanol/methyl acetate at a ratio of 15/85 (v/v).

Further, in order to reduce the amount of methanol, the particle size of the final PVOH resin can be reduced such that more than 95 wt. % pass through a 1.0 mm sieve, or more than 30% pass through a 500 micron sieve, or more than 45% pass through a 500 micron sieve. If the particle size of the final PVOH resin is too large, volatilization of the methanol becomes difficult.

For PVOH copolymer containing monoesters, diesters, or anhydrides of ethylenically unsaturated dicarboxylic acid, the amount of insoluble components can be reduced by controlling the ratio of lactone ring formation to copolymer modification by partial saponification. The ratio of lactone ring formation to copolymer modification can be described by the equation (Q):

$$0.05 \leq Y/X < 0.98 \quad (Q)$$

wherein X is the copolymer modification and Y is the lactone ring formation. To reduce the amount of insoluble materials, Y/X is about 0.80 or less, about 0.60 or less, or about 0.40 or less.

The PVOH resin blend includes a second PVOH polymer. The second PVOH polymer consists essentially of vinyl alcohol monomer units and optionally vinyl acetate monomer units (e.g., a PVOH homopolymer).

The water-soluble film may contain at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. % of the PVOH resin blend. Preferably the resin blend is present in the film from about 50% to about 80%, more preferably from about 60% to about 75%.

The first PVOH polymer may be present in the water-soluble film in an amount in a range of about 10 wt. % to about 70 wt. %, or about 10 wt. % to about 60 wt. %, or about 20 wt. % to about 50 wt. %, or about 30 wt. % to about 40 wt. % of total PVOH polymers in the film (i.e., relative to the PVOH resin blend weight). For example, the first PVOH polymer may be present in an amount of at least about 10 wt. %, 20 wt. %, 30 wt. %, 40 wt. %, 50 wt. %, 60 wt. %, and/or up to about 70 wt. %, 60 wt. %, 50 wt. %, 40 wt. %, 30 wt. %, 20 wt. %, or 10 wt. %, of total PVOH polymers in the film, preferably at least about 30 wt % and/or up to about 40 wt %. The foregoing concentrations of first PVOH copolymer alternatively or additionally can be relative to total water-soluble polymer content in film, PVOH or otherwise.

The second PVOH polymer may be present in an amount in a range of about 30 wt. % to about 90 wt. %, or from about 40 wt. % to about 90 wt. %, or from about 50 wt. % to about 80 wt. %, or from about 60 wt. % to about 70 wt. %, of total PVOH polymers in the film (i.e., relative to the PVOH resin blend weight). For example, the second PVOH polymer may be present in an amount of at least 30 wt. %, 40 wt. %, 50 wt. %, or 60 wt. % and/or up to about 90 wt. %, 80 wt. %, 70 wt. %, 60 wt. %, 50 wt. %, or 40 wt. % of total PVOH polymers in the film, preferably at least about 60 wt % and/or up to about 70 wt %. The foregoing concentrations of second PVOH polymer alternatively or additionally can be relative to total water-soluble polymer content in film, PVOH or otherwise.

As described in more detail below, the PVOH polymers may be characterized in terms of their viscosities (the values of which generally correlate to the molecular weights of the polymers). The viscosity of a polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise. For reference, the first PVOH polymer may be denoted as having a first 4% solution viscosity at 20° C. ($\mu_1$), and the second PVOH polymer may be denoted as having a second 4% solution viscosity at 20° C. ($\mu_2$).

The first PVOH polymer may be characterized by a 4% solution viscosity at 20° C. ($\mu_1$) of from about 10 cP to about 40 cP, or from about 10 cP to about 30 cP, or from about 12 cP to about 25 cP, or from 14 cP to 20 cP. The first viscosity $\mu_1$ may be in a range of about 4 cP to about 24 cP (e.g., at least about 4, 8, 10 or 12 cP and/or up to about 12, 16, 20, or 24 cP, such as about 10 cP to about 16 cP or about 10 cP to about 20 cP). The second PVOH polymer may be characterized by a 4% solution viscosity at 20° C. ($\mu_2$) of from about 3.0 cP to about 40 cP, or from about 7 cP to about 40 cP, of from about 10 cP to about 40 cP, or from about 10 cP to about 30 cP, or from about 12 cP to about 25 cP. The second viscosity $\mu_2$ may be in a range of about 4 cP to about 24 cP (e.g., at least about 4, 8, 10 or 12 cP and/or up to about 12, 16, 20, or 24 cP, such as about 10 cP to about 16 cP or about 10 cP to about 20 cP). The second PVOH polymer can have a second 4% solution viscosity at 20° C. ($\mu_2$) of about 20 cP or less (e.g., at least about 4, 8, 10, or 12 cP and/or up to about 12, 16, or 20 cP). An absolute viscosity difference $|\mu_2-\mu_1|$ for the first PVOH polymer and the second PVOH polymer may be in a range of 0 cP to about 10 cP, or at least about 0, 0.5, 1, or 2 cP and/or up to about 8, 9 or 10 cP, such as from about 0 cP to about 10 cP, or from about 2 cP to about 8 cP.

It is well known in the art that the viscosity of a water-soluble polymer (PVOH or otherwise) is correlated with the weight-average molecular weight ($\overline{M}w$) of the same polymer, and often the viscosity is used as a proxy for $\overline{M}w$. Thus, the weight-average molecular weight of the water-soluble polymers, including the first PVOH copolymer and second PVOH polymer, can be in a range of about 30,000 to about 175,000, or about 30,000 to about 100,000, or about 55,000 to about 85,000, for example.

When the PVOH resin blend includes three or more PVOH resins selected from PVOH polymer and PVOH copolymer resins, the foregoing viscosity values can apply to each PVOH polymer or PVOH copolymer individually and the foregoing viscosity differences can apply to each PVOH polymer/PVOH copolymer pair in the PVOH resin blend and resulting water-soluble film.

As described above, PVOH polymers may be characterized by a degree of hydrolysis. The first PVOH polymer may be characterized by a degree of hydrolysis of 60% to about 99%, preferably from about 80% to about 98%, preferably from about 83% to about 95%, preferably from about 85% to about 92%. The second PVOH polymer may be characterized by a degree of hydrolysis of from about 60% to about 99%, preferably from about 80% to about 98%, preferably from about 85% to about 95%, preferably from about 87% to about 92%.

Other Film Components and/or Characteristics

In addition to the polyvinyl alcohol polymers described above, the water-soluble films of the present disclosure may include other components.

The films of the present disclosure may include other water-soluble polymers. Other water soluble polymers for use in addition to the PVOH polymers and PVOH copolymers in the blend can include, but are not limited to modified polyvinyl alcohols, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, and polymethacrylates. Such water-soluble polymers, whether PVOH or otherwise are commercially available from a variety of sources. Any of the foregoing water-soluble polymers may be generally suitable for use as film-forming polymers. In general, the water-soluble film can include copolymers and/or blends of the foregoing resins.

The water-soluble polymers (e.g., the PVOH resin blend in combination with other water-soluble polymers) can be included in the film in an amount in a range of about 30 wt. % or 50 wt. % to about 90 wt. % or 95 wt. %, for example. The weight ratio of the amount of all water-soluble polymers as compared to the combined amount of all plasticizers, compatibilizing agents, and secondary additives can be in a range of about 0.5 to about 18, about 0.5 to about 15, about 0.5 to about 9, about 0.5 to about 5, about 1 to 3, or about 1 to 2, for example. Preferably this ratio is from about 1 to about 3, more preferably from about 1.3 to about 2.5. The specific amounts of plasticizers and other non-polymer component can be selected in a particular embodiment based on an intended application of the water-soluble film to adjust film flexibility and to impart processing benefits in view of desired mechanical film properties.

Water-soluble polymers for use in the film described herein (including, but not limited to PVOH polymers and PVOH copolymers) can be characterized by a viscosity in a range of about 3.0 to about 40 cP, or to about 30 cP, or to about 27.0 cP, from about 4.0 to about 24.0 cP, about 4.0 to about 23.0 cP, about 4.0 cP to about 15 cP, or about 6.0 to about 10.0 cP, for example. The viscosity of a polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise.

It is well known in the art that the viscosity of a water-soluble polymer (PVOH or otherwise) is correlated with the weight-average molecular weight ($\overline{M}w$) of the same polymer, and often the viscosity is used as a proxy for $\overline{M}w$. Thus, the weight-average molecular weight of the water-soluble polymers, including the first PVOH copolymer and second PVOH polymer, can be in a range of about 30,000 to about 175,000, or about 30,000 to about 100,000, or about 55,000 to about 85,000, for example.

The water-soluble film can contain other auxiliary agents and processing agents, such as, but not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Films that include plasticizers are beneficial. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively. Preferably the total amount of such auxiliary agents and processing aids in the film is from about 20% to about 50%, more preferably from about 25% to about 40%.

The plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol, ethanolamines, and a mixture thereof. A preferred plasticizer is glycerin, sorbitol, triethyleneglycol, propylene glycol, diproylene glycol, 2-methyl-1,3-propanediol, trimethylolpropane, or a combination thereof. The total amount of the plasticizer can be in a range of about 1 wt. % to about 40 wt. %, or 10 wt. % to about 40 wt. %, or about 15 wt. % to about 35 wt. %, or about 20 wt. % to about 30 wt. %, for example about 25 wt. %, based on total film weight. Combinations of glycerin, dipropylene glycol, and sorbitol can be used. Alternatively combinations of glycerin, trimethylolpropane and sorbitol can be used. Optionally, glycerin can be used in an amount of about 5 wt % to about 30 wt %, or 5 wt % to about 20 wt %, e.g., about 13 wt %. Optionally, dipropylene glycol or trimethylolpropane can be used in an amount of about 1 wt. % to about 20 wt. %, or about 3 wt. % to about 10 wt. %, for example 6 wt. %. Optionally, sorbitol can be used in an amount of about 1 wt % to about 20 wt %, or about 2 wt % to about 10 wt %, e.g., about 5 wt %. The specific amounts of plasticizers can be selected in a particular embodiment based on desired film flexibility and processability features of the water-soluble film. At low plasticizer levels, films may become brittle, difficult to process, or prone to breaking. At elevated plasticizer levels, films may be too soft, weak, or difficult to process for a desired use.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. The amount of surfactant in the water-soluble film may be in a range of about 0.1 wt % to 2.5 wt %, optionally about 1.0 wt % to 2.0 wt %.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film may be in a range of about 0.02 wt % to about 1.5 wt %, optionally about 0.1 wt % to about 1 wt %.

The film may include an aversive agent, such as a bittering agent, e.g., denatonium benzoate and/or a derivative thereof. The aversive agent may be mixed with the polymeric material and/or other adjuncts prior to making the film (e.g., prior to casting or extruding the film). Alternatively or additionally, the aversive agent may be added to the film or to the pouch once formed, for example, added by dusting, printing, spraying, or otherwise coating.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. The amount of filler/extender/antiblocking agent/detackifying agent in the water-soluble film may be in a range of about 0.1 wt % to about 25 wt %, or about 1 wt % to about 10 wt %, or about 2 wt. % to about 8 wt. %, or about 3 wt. % to about 5 wt. %. In the absence of starch, one preferred range for a suitable filler/extender/antiblocking agent/detackifying agent is about 0.1 wt % or 1 wt % to about 4 wt % or 6 wt %, or about 1 wt. % to about 4 wt. %, or about 1 wt. % to about 2.5 wt. %.

The water-soluble film can further have a residual moisture content of at least 4 wt. %, preferably in a range of about 4 to about 10 wt. %, as measured by Karl Fischer titration.

The film may be opaque, transparent or translucent. The film may comprise a printed area. The area of print may cover an uninterrupted portion of the film or it may cover parts thereof. The area of print may comprise inks, pigments, dyes, blueing agents or mixtures thereof. The area of print may comprise a single colour or maybe comprise multiple colors, even three colors. The print may be present as a layer on the surface of the film or may at least partially penetrate into the film. The film will comprise a first side and a second side. The area of print may be achieved using standard techniques, such as flexographic printing or inkjet printing. The area of print may be on either or both sides of the film. Alternatively, an ink or pigment may be added during the manufacture of the film such that all or at least part of the film is colored.

Method of Making Film

The water-soluble film may be formed by, for example, admixing, co-casting, or welding the first PVOH copolymer and the second PVOH polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. The water-soluble film may be formed by extrusion, for example, blown extrusion.

The film can have any suitable thickness. For example, the film can have a thickness in a range of about 5 to about 200 μm, or in a range of about 20 to about 100 μm, or about 35 μm to about 100 μm, or about 40 to about 85 μm, for example 76 μm. When a pouch is made, for example through thermoforming as described below, the film may be deformed, resulting in varying film thicknesses in a pouch. Therefore, an undeformed thickness of the film may be determined prior to deformation and/or pouch formation.

Optionally, the water-soluble film can be a free-standing film consisting of one layer or a plurality of like layers.

The film described herein can also be used to make an article such as a packet with two or more compartments made of the same film or in combination with films of other polymeric materials. Additional films can, for example, be obtained by casting, blow-molding, extrusion or blown extrusion of the same or a different polymeric material, as known in the art. The polymers, copolymers or derivatives thereof suitable for use as the additional film may be selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of films is characterized by the level of polymer in the pouch material, for example the PVOH resin blend, as described above, being at least 60%. As described above, the film may be printed upon.

Use of the Film

The present disclosure further relates to the use of a film as described herein to provide a pouch that exhibits improved cold-water solubility. Preferably, the pouch includes a household care composition, such as a laundry detergent. The pouch may exhibit improved solubility in water at a temperature of from about 1° C. to about 30° C., or from about 5° C. to about 20° C.

Composition

The present articles (e.g., in the form of pouches or packets) may contain various compositions, for example household care compositions. A multi-compartment pouch may contain the same or different compositions in each separate compartment. The composition is proximal to the water-soluble film. The composition may be less than about 10 cm, or less than about 5 cm, or less than about 1 cm from the film. Typically the composition is adjacent to the film or in contact with the film. The film may be in the form of a pouch or a compartment, containing the composition therein.

As described above, the film and pouch are particularly advantageous for packaging (e.g., in direct contact with) materials which have exchangeable hydrogen ions, for example compositions characterized by acid/base equilibria, such as amine-fatty acid equilibria and/or amine-anionic surfactant acid equilibria.

Multi-compartment pouches may be useful to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits.

Non-limiting examples of useful compositions (e.g., household care compositions) include light duty and heavy duty liquid detergent compositions, hard surface cleaning compositions, detergent gels commonly used for laundry, bleach and laundry additives, fabric enhancer compositions (such as fabric softeners), shampoos, body washes, and other personal care compositions. Compositions of use in the present pouches may take the form of a liquid, solid or a powder. Liquid compositions may comprise a solid. Solids may include powder or agglomerates, such as micro-capsules, polymeric beads, noodles or one or more pearlized balls or mixtures thereof. Such a solid element may provide a technical benefit, through the wash or as a pre-treat, delayed or sequential release component; additionally or alternatively, it may provide an aesthetic effect.

The compositions encapsulated by the films described herein can have any suitable viscosity depending on factors such as formulated ingredients and purpose of the composition. The composition may have a high shear viscosity value, at a shear rate of 20 s$^{-1}$ and a temperature of 20° C., of 100 to 3,000 cP, alternatively 300 to 2,000 cP, alternatively 500 to 1,000 cP, and a low shear viscosity value, at a shear rate of 1 s$^{-1}$ and a temperature of 20° C., of 500 to 100,000 cP, alternatively 1000 to 10,000 cP, alternatively 1,300 to 5,000 cP. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 s$^{-1}$, and an equilibration of 60 seconds at the selected temperature. The peak hold involves applying a shear rate of 0.05 s$^{-1}$ at 20° C. for 3 min with sampling every 10 s. The continuous ramp step is performed at a shear rate from 0.1 to 1200 s$^{-1}$ for 3 min at 20° C. to obtain the full flow profile.

In pouches or other articles comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules; perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors; cationic starches; scum dispersants; substantive dyes; hueing dyes; colorants; opacifier; antioxidant; hydrotropes such as toluenesulfonates, cumenesulfonates and naphthalenesulfonates; color speckles; colored beads, spheres or extrudates; clay softening agents; anti-bacterial agents. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Surfactants

The detergent compositions can comprise from about 1% to 80% by weight of a surfactant. Surfactant is particularly preferred as a component of the first composition. Preferably, the first composition comprises from about 5% to 50% by weight of surfactant. The second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration. Especially valuable are linear straight chain alkylbenzene sulfonates in which the average number of carbon atoms in the alkyl group is from about 11 to 13, abbreviated as $C_{11}$-$C_{13}$ LAS.

Anionic surfactants of the present disclosure and adjunct anionic cosurfactants, may exist in an acid form, and said acid form may be neutralized to form a surfactant salt which is desirable for use in the present detergent compositions. Typical agents for neutralization include the metal counterion base such as hydroxides, eg, NaOH or KOH. Further preferred agents for neutralizing anionic surfactants of the present disclosure and adjunct anionic surfactants or cosurfactants in their acid forms include ammonia, amines, or alkanolamines Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Preferred nonionic surfactants are those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

The composition may comprise from 5 to 60% or from about 15 to about 50%, or from about 20 to about 45% surfactant. The composition may comprise surfactant, wherein the surfactant comprises anionic surfactant and nonionic surfactant in a weight ratio of from about 20:1 to about 1:3, or from about 15:1 to about 1:2, or from about 12:1 to about 3:1, wherein the anionic surfactant is comprised of one or more of fatty acids, alkyl ether sulphates, alkylbenzene sulfonates or combinations thereof.

Solvent System

The solvent system in the present compositions can be a solvent system containing water alone or mixtures of organic solvents with water. Preferred organic solvents include glycerol, ethylene glycol, 1,3 propanediol, 1,2 propanediol, tetramethylene glycol, pentamethylene glycol, hexamethylene glycol, 2,3-butane diol, 1,3 butanediol, diethylene glycol, triethylene glycol, polyethylene glycol, glycerol formal dipropylene glycol, polypropylene glycol, dipropylene glycol n-butyl ether, and mixtures thereof, more preferably 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, preferably at least about 1% to about 50%, more usually from about 5% to about 25%, by weight of the composition. Typically, the present compositions, particularly when in liquid form, comprise less than 50% water, preferably from about 0.1% to about 20% water, or more preferably from about 0.5% to about 15%, or from about 5% to about 12%, by weight of the composition, of water. For forms comprising liquids, preferred solvent ranges are from about 5% to about 60%, preferably from about 10% to about 50%, more preferably from about 20% to about 45%, by weight of the composition. The solvent systems preferably comprise a mix of water and glycols, where the glycol may be selected from the group comprising glycerol, 1,2, propane diol, 1.3, propane diol and dipropylene glycol. The glycerol may be present in an amount less than about 15%, preferably less than about 10%, of the total composition by weight. The total combined amount of water and glycerol may be from about 3% to about 20%, preferably from about 5% to about 15%, by weight of the composition.

The choice of solvent type and level is used to control final pouch quality, including phase stability of the liquid ingredients, the tightness/floppiness of the pouch, pouch strength and to control the diffusion of chemistry through the film. Without wishing to be bound by theory it is believed that preferred solvent systems (as described above) ensure a good balance of film plasticization. If the system contains too much water and glycerol, then the pouches become too floppy, and at too low a level, the pouches can become too brittle.

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful compositions may be from about 2 to about 12, about 4 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Auto-dishwashing compositions may have a pH of about 8 to about 12. Laundry detergent additive compositions may have a pH of about 4 to about 8. Fabric enhancers may have a pH of from about 2 or 4 to about 8, or from about 2 to about 4, or from about 2.5 to about 3.5, or from about 2.7 to about 3.3.

The pH of the detergent is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark—Keppekouter, Ninovesteenweg 198, 9320 Erembodegem—Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to a 100 mL volumetric flask, diluted to volume with purified water (deionized and/or distilled water are suitable as long as the conductivity of the water is <5☐S/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <5☐S/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Bleaches

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated as is known in the art.

Alkali metal percarbonates, particularly sodium percarbonate are preferred perhydrates for use in the detergent composition described herein. The percarbonate is most preferably incorporated into the products in a coated form which provides in-product stability. A suitable coating material providing in product stability comprises mixed salt of a water-soluble alkali metal sulphate and carbonate. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4 + n \cdot Na_2CO_3$ wherein n is from 0.1 to 3, preferably from 0.3 to 1.0, and more preferably from 0.2 to 0.5. Another suitable coating material providing in product stability comprises sodium silicate of $SiO_2:Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously Organic bleaches can include organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, preferably can be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Other organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyl-diperoxybutane-1,4-dioic acid, N,N-terephthaloyldi(6-aminopercaproic acid)

Bleach activators can include organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use in the detergent composition herein include the manganese triazacyclononane and related complexes; Co, Cu, Mn and Fe bispyridylamine and related complexes; and pentamine acetate cobalt(III) and related complexes.

Dishwashing Agents

A preferred surfactant for use in automatic dishwashing detergents is low foaming by itself or in combination with other components (e.g. suds suppressors). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B—see WO-A-94/22800), ether-capped poly(oxyalkylated) alcohol surfactants, and block polyoxyethylene-polyoxypropylene polymeric compounds such as PLURONIC□, REVERSED PLURONIC□, and TETRONIC□ by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants can be present at a level of from about 0.2% to about 30% by weight, more preferably from about 0.5% to about 10% by weight, most preferably from about 1% to about 5% by weight of a detergent composition.

Other Compositions and Additives

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

The consumer products can comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a consumer product, the aforementioned additional enzymes may be present at levels from about 0.00001% to about 2%, from about 0.0001% to about 1% or even from about 0.001% to about 0.5% enzyme protein by weight of the consumer product.

The enzymes may include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. The suitable protease may be a serine protease, such as an alkaline microbial protease or/and a trypsin-type protease. Examples of suitable neutral or alkaline proteases include subtilisins and metalloproteases.

Preferred proteases include those derived from *Bacillus gibsonii* or *Bacillus Lentus* or *Bacillus amyloliquefaciens* and include those derived from the BPN', GG36 and TY145 backbones.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Blaze®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase®, Ultimase®, Purafect OXP® and the Preferenz P® series by DuPont International Biosciences.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375, DSM 12368, DSMZ no. 12649, KSM AP1378, KSM K36 or KSM K38. Preferred amylases include those derived from the AA560, sp722, TS23, AmyE and sp707 backbones and preferably said amylases comprise mutations from a parent backbone that exhibits at least 70%, preferably 80% or 85% or 90% or 95% or 98% or 99% or 100% identity to these backbones.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM®, PREFERENZ® S series, including PREFERENZ S1000 and PREFERENZ S110 (DuPont Industrial Biosciences, Palo Alto, Calif.) and KAM® (Kao, 14-10 Nihonbashi Kayabacho, 1-chome, Chuo-ku Tokyo 103-8210, Japan). In one aspect, suitable amylases include NATALASE®, EVEREST®, PREFERENZ S1000®, PREFERENZ S2000®, STAINZYME® and STAINZYME PLUS® and mixtures thereof.

Tenzymes may include lipases, including "first cycle lipases" such as those described in U.S. Pat. No. 6,939,702 B1 and US PA 2009/0217464. The lipase may include a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot O59952 (derived from *Thermomyces lanuginosus (Humicola lanuginosa)*). Preferred lipases would include those sold under the tradenames Lipex®, Lipoclean®, Lipex Evity®, Calipso® and Lipolex®.

Other preferred enzymes include fungal and microbial-derived endoglucanases exhibiting endo-beta-1,4-glucanase activity (E.C. 3.2.1.4). Suitable endoglucanases are sold under the tradenames Celluclean®, Celluclean Classic, Carezyme® Premium, Carezyme®, Celluzyme®, Carezyme Premium® and Whitezyme® (Novozymes A/S, Bagsvaerd, Denmark) or under Puradax™ and/or Revitalenz™ (DuPont) tradenames.

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Preferenz F® and Purabrite® (DuPont International Biosciences, Palo Alto, Calif.).

Suitable enzyme mixtures include those sold under the Preferenz™, Smartenz™, Sharpenz™, Excellenz™, Marvellenz™, Renewenz™, Revitalenz™ and Effectenz™ ranges and the Medley® (Novozymes A/S) range.

Enzymes for use in household care compositions can be stabilized by various techniques. The enzymes employed herein can be stabilized by the presence of water-soluble sources of calcium and/or magnesium ions in the finished fabric and home care products that provide such ions to the enzymes. In case of aqueous consumer products comprising protease, a reversible protease inhibitor, such as peptide aldehydes or a boron compound including borate, 4-formyl phenylboronic acid, phenylboronic acid and derivatives thereof, or compounds such as calcium formate, sodium formate and 1,2-propane diol can be added to further improve stability.

The composition may comprise a fabric hueing agent. Suitable fabric hueing agents include dyes, dye-clay conjugates, and pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof. Preferred dyes include alkoxylated azothiophenes, Solvent Violet 13, Acid Violet 50 and Direct Violet 9.

The composition may comprise an encapsulate. In one aspect, an encapsulate comprising a core, a shell having an inner and outer surface, said shell encapsulating said core. The core may comprise perfume. The shell may comprise melamine formaldehyde and/or cross linked melamine formaldehyde. The shell may comprise a polyacrylate polymer.

Suitable encapsulates may comprise a core material and a shell, said shell at least partially surrounding said core material. At least 75%, 85% or even 90% of said encapsulates may have a fracture strength of from about 0.2 MPa to about 10 MPa, from about 0.4 MPa to about 5 MPa, from about 0.6 MPa to about 3.5 MPa, or even from about 0.7 MPa to about 3 MPa; and a benefit agent leakage of from 0% to about 30%, from 0% to about 20%, or even from 0% to about 5%. In one aspect, at least 75%, 85% or even 90% of said encapsulates may have a particle size of from about 1 microns to about 80 microns, about 5 microns to 60 microns, from about 10 microns to about 50 microns, or even from about 15 microns to about 40 microns. In one aspect, at least 75%, 85% or even 90% of said encapsulates may have a particle wall thickness of from about 30 nm to about 250 nm, from about 80 nm to about 180 nm, or even from about 100 nm to about 160 nm.

In one aspect, said encapsulates' core material may comprise a material selected from the group consisting of a perfume raw material and/or optionally a material selected from the group consisting of vegetable oil, including neat and/or blended vegetable oils including caster oil, coconut oil, cottonseed oil, grape oil, rapeseed, soybean oil, corn oil, palm oil, linseed oil, safflower oil, olive oil, peanut oil, coconut oil, palm kernel oil, castor oil, lemon oil and mixtures thereof; esters of vegetable oils, esters, including dibutyl adipate, dibutyl phthalate, butyl benzyl adipate, benzyl octyl adipate, tricresyl phosphate, trioctyl phosphate and mixtures thereof; straight or branched chain hydrocarbons, including those straight or branched chain hydrocarbons having a boiling point of greater than about 80° C.; partially hydrogenated terphenyls, dialkyl phthalates, alkyl biphenyls, including monoisopropylbiphenyl, alkylated naphthalene, including dipropylnaphthalene, petroleum spirits, including kerosene, mineral oil and mixtures thereof; aromatic solvents, including benzene, toluene and mixtures thereof; silicone oils; and mixtures thereof.

The composition can also comprise a deposition aid, preferably consisting of the group comprising cationic or nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or monomers selected from the group comprising acrylic acid and acrylamide.

Suds suppressers suitable for use in the detergent composition described herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT SLF18) and epoxy-capped poly(oxyalkylated) alcohols (e.g., BASF POLY-TERGENT SLF18B series of nonionics).

Other suitable components for use in the household care composition described herein include cleaning polymers having anti-redeposition, soil release or other detergency properties. Anti-redeposition polymers for use herein include acrylic acid containing polymers such as SOKALAN PA30, PA20, PA15, PA10 and SOKALAN CP10 (BASF GmbH), ACUSOL 45N, 480N, 460N (Rohm and Haas), acrylic acid/maleic acid copolymers such as SOKALAN CP5, and acrylic/methacrylic copolymers. The household care composition may comprise amphiphilic alkoxylated grease cleaning polymers which have balanced hydrophilic and hydrophobic properties such that they remove grease particles from fabrics and surfaces. The amphiphilic alkoxylated grease cleaning polymers of the present disclosure may comprise a core structure and a plurality of alkoxylate groups attached to that core structure. Suitable polymers include amine-based polymers such as alkoxylated polyalkyleneimines (e.g., PEI600 EO20 and/or ethoxysulfated hexamethylene diamine dimethyl quats), which, optionally, may be quaternized. Other polymers include alkoxylated polyalkylenimines that have an inner polyethylene oxide block and an outer polypropylene oxide block. Soil release polymers for use herein include alkyl and hydroxyalkyl celluloses, polyoxyethylenes, polyoxypropylenes and copolymers thereof, and nonionic and anionic polymers based on terephthalate esters of ethylene glycol, propylene glycol and mixtures thereof.

Structured liquids can either be internally structured, whereby the structure is formed by primary ingredients (e.g. surfactant material) and/or externally structured by providing a three dimensional matrix structure using secondary ingredients (e.g. polymers, clay and/or silicate material). The composition may comprise a structurant, preferably from 0.01 wt % to 5 wt %, from 0.1 wt % to 2.0 wt % structurant. The structurant is typically selected from the group consisting of diglycerides and triglycerides, ethylene glycol distearate, microcrystalline cellulose, cellulose-based materials, microfiber cellulose, hydrophobically modified alkali-swellable emulsions such as Polygel W30 (3VSigma), biopolymers, xanthan gum, gellan gum, and mixtures thereof. A suitable structurant includes hydrogenated castor oil, and non-ethoxylated derivatives thereof. Such structurants have a thread-like structuring system having a range of aspect ratios.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG 70 sold by Wintershall, Salzbergen, Germany), nitrogen-containing corrosion inhibitor compounds (for example benzotriazole and benzimadazole and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process. Rinse aids may contain mixed ethers as surfactants. Rinse additives such as fabric softeners and the like are also contemplated and suitable for encapsulation in a film according to the disclosure herein.

Methods of Making Pouches

The present disclosure relates to methods of making or forming pouches. In general, the method includes the steps of: providing a water-soluble film as described herein; shaping the film to form an open compartment; providing the composition to the open compartment; and sealing the open compartment to form a pouch having a sealed compartment having the composition enclosed therein. The open compartment may be sealed with at least a second sealed compartment, thereby forming a pouch having superposed compartments. These steps are described in more detail below.

The methods of forming pouches described herein may include thermoforming the film. Therefore, the films may be characterized by good thermoformability of the water-soluble film made as described herein. A thermoformable film is one that can be shaped through the application of heat and a force.

Thermoforming a film is the process of heating the film, shaping it in a mold, and then allowing the film to cool, whereupon the film will hold the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. The film may be heated using an infrared light. The film may be heated to a temperature of about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum, thereby forming an open compartment. A composition, such as a household care composition, may be provided to the open compartment, for example via a suitable filling nozzle. The filling of the molded film can be accomplished by utilizing any suitable means. The most preferred method will depend on the product form and required speed of filling. The molded film may be filled by in-line filling techniques. The filled, open compartments are then sealed closed to form pouches having sealed compartments with the composition enclosed therein by any suitable method, for example by using a second film. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, cojoined pouches may or may not be separated by cutting. Alternatively, the compartments can be made separately.

Pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

Second and/or third compartment(s) can be made in a separate step and then combined with the first compartment.

Pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. The first forming machine may be a horizontal forming machine, and the second forming machine may be a rotary drum forming machine, for example located above the first forming machine.

It should be understood that by the use of appropriate feed stations, it may be possible to manufacture multi-compartment pouches incorporating a number of different or distinctive compositions and/or different or distinctive liquid, gel or paste compositions.

The film and/or pouch may be sprayed or dusted with a suitable material, such as an active agent, a lubricant, an aversive agent, or mixtures thereof. The film and/or pouch may be printed upon, for example, with an ink and/or an active agent.

Methods of Use

The present disclosure further relates to methods of using the pouches described herein. For example, the present disclosure relates to a method of treating a substrate, such as a fabric.

The pouches described herein, as well as compositions contained therein, may be used in methods to treat a substrate, e.g., fabric or a hard surface, for example by contacting the substrate with the film, article, and/or composition contained therein. The method may include the steps of combining the pouch with water, allowing for at least some of the film of the pouch to dissolve in the presence of water, diluting the composition contained therein 300-800 fold with water to form a wash liquor, and/or contacting the substrate, preferably a fabric, with the wash liquor; the substrate, preferably the fabric to be treated, may comprise one or more stains.

The contacting step may occur manually or in an automatic machine, e.g., an automatic (top or front-loading) laundry machine or an automatic dishwashing machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. As noted above, the present films and articles made therefrom are particularly suited for cold water dissolution and therefore provide benefits in cold-water washes (e.g., from about 1° C. to about 30° C., or from about 5° C. to about 20° C.). The contacting step may be followed by a multi-rinse cycle or even by a single rinse cycle; because the film has good dissolution properties, less water is required to dissolve the film and/or release the contents contained therein. Pouches according to the invention can also be used in evolving short wash or quick wash cycles, or even smart cycles where the machine adapts the wash cycle per the actual sensed wash conditions.

Test Methods

The following test methods are to be used to determine some of the particular characteristics described herein.

Dissolution Chamber Residue Test

A water-soluble film characterized by or to be tested for undissolved residue according to the Dissolution Chamber (DC) Test is analyzed as follows using the following materials:

1. Beaker (4000 ml);
2. Stainless steel washers (3.5" (88.9 mm) OD, 1.875" ID (47.6 mm), 0.125" (3.18 mm) thick);
3. Styrene-butadiene rubber gaskets (3.375" (85.7 mm) OD, 1.91" ID (48.5 mm), 0.125" thick (3.18 mm));
4. Stainless steel screens (3.0" (76.2 mm) OD, 200×200 mesh, 0.0021" (0.053 mm) wire OD, 304SS stainless steel wire cloth);
5. Thermometer (0° C. to 100° C., accurate to +/−1° C.);
6. Cutting punch (1.5" (38.1 mm) diameter);
7. Timer (accurate to the nearest second);
8. Reverse osmosis (RO) water;
9. Binder clips (size #5 or equivalent);
10. Aluminum pans (2.0" (50.8 mm) OD); and
11. Sonicator.

For each film to be tested, three test specimens are cut from a selected test film having a thickness of 3.0±0.10 mil (or 76.2±2.5 µm) using the cutting punch. If cut from a film web, the specimens should be cut from areas of web evenly spaced along the transverse direction of the web. Each test specimens is then analyzed using the following procedure:

1. Weigh the film specimen and track the specimen through the test. Record the initial film weight ($F_o$).
2. Weigh a set of two sonicated, clean, and dry screens for each specimen and track them through the test. Record the initial screen weights (collectively $S_o$ for the two screens combined).
3. Assemble a specimen dissolution chamber by flatly sandwiching the film specimen between the center of the two screens, followed by the two rubber gaskets (one gasket on each side between the screen and washer), and then the two washers.
4. Secure the dissolution chamber assembly with four binder clips evenly spaced around the washers and the clips folded back.
5. Fill the beaker with 1,500 ml of reverse osmosis water at laboratory room temperature (72+/−3° F., 22+/−2° C.) and record the room temperature.
6. Set the timer to a prescribed immersion time of 5 minutes.
7. Place the dissolution chamber assembly into the beaker and immediately start the timer, inserting the dissolution chamber assembly at an approximate 45 degree entry angle into the water surface. This entry angle helps remove air bubbles from the chamber. The dissolution chamber assembly rests on the beaker bottom such that the test specimen film is positioned horizontally about 10 mm from the bottom. The four folded-back binder clips of the dissolution chamber assembly are suitable to maintain the about 10 mm film clearance from the beaker bottom, however, any other equivalent support means may be used.

8. At the prescribed elapsed prescribed immersion time of 5 minutes, slowly remove the dissolution chamber assembly from the beaker at an approximate 45 degree angle.

9. Hold the dissolution chamber assembly horizontally over the aluminum pan to catch any drips from the screens and carefully remove the binder clips, washers, and gaskets. Do not break open the sandwiched screens.

10. Place the sandwiched screens (i.e., screen/residual undissolved film/screen) over the aluminum pan and into an oven at 100° C. for 30 minutes to dry.

11. Weigh the dried set of sandwiched screens including any residual undissolved film therein. Measure and add to this dried screen weight any dried film drippings captured in and recovered from (e.g., by scraping) the pan when the dissolution chamber assembly was first removed from the beaker and during drying. Record the final sandwiched screen weight (collectively $S_f$, including the dried film drippings).

12. Calculate % residue ("DC residue") left for the film specimen: % DC residue=$100*((S_f-S_0)/F_0)$.

13. Clean the sandwiched screens by soaking them in a beaker of RO water for about 20 minutes. Then, take them apart and do a final rinse in the sonicator (turned on and filled with RO water) for at least 5 minutes or until no residue is visible on the screens.

Suitable behavior of water-soluble films according to the disclosure is marked by DC residue values of about 45 wt. % or less or about 48 wt. % or less as measured by the DC Test. The water-soluble film may have a DC value of at least 1, 2, 5, 10, or 20 wt. % and/or up to about 15, 20, 30, 40, 45 wt. %, or 48 wt. % (e.g., about 5 wt. % to about 48 wt. %, about 10 wt. % to about 45 wt. %, about 20 wt. % to about 45 wt. %, or about 30 wt. % to about 40 wt. %).

Tensile Strength Test and Modulus Test

A water-soluble film characterized by or to be tested for tensile strength according to the Tensile Strength (TS) Test and modulus (or tensile stress) according to the Modulus (MOD) Test is analyzed as follows. The procedure includes the determination of tensile strength and the determination of modulus at 100% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a single film sheet having a thickness of 3.0±0.15 mil (or 76.2±3.8 µm) are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine, elongated, and analyzed to determine the 100% modulus (i.e., stress required to achieve 100% film elongation) and tensile strength (i.e., stress required to break film).

Optionally, the films can be characterized by particular mechanical properties which make the films suitable for processing into articles, e.g. filmed pouches.

The water-soluble films according to the disclosure can be marked by TS values of at least about 24 MPa or about 28 MPa as measured by the TS Test. Generally, higher TS values are desirable because they correspond to stronger pouch seals when the film is the limiting or weakest element of a seal. The water-soluble film may have a TS value of at least about 24, 26, 28, 30, 33, or 35 MPa and/or up to about 32, 34, 40, 45, or 50 MPa (e.g., about 24 MPa to about 36 MPa or about 28 MPa to about 32 MPa). Alternatively or additionally, an upper bound for a suitable TS value range can be a TS value for a corresponding water-soluble film having only a single PVOH polymer or PVOH copolymer of the PVOH polymers and PVOH copolymers in the PVOH resin blend (e.g., a corresponding single-resin film having the higher TS value).

The water-soluble films according to the disclosure can be marked by MOD values of at least about 11 N/mm$^2$ or about 12 N/mm$^2$ as measured by the MOD Test. Generally, higher MOD values are desirable because they correspond to pouches having a greater stiffness and a lower likelihood of deforming and sticking to each other when loaded on top of each other during production or in final consumer packaging. The water-soluble film may have a MOD value of at least about 11, 12, or 13 N/mm$^2$ and/or up to about 13, 14, 15, or 16 N/mm$^2$ (e.g., about 11 N/mm$^2$ to about 15 N/mm$^2$ or about 12 N/mm$^2$ to about 14 N/mm$^2$). Alternatively or additionally, an upper bound for a suitable MOD value range can be a MOD value for a corresponding water-soluble film having only a single PVOH polymer or PVOH copolymer of the PVOH polymers and PVOH copolymers in the PVOH resin blend (e.g., a corresponding single-resin film having the higher MOD value).

Pouch Strength Test Method

This test method describes the practice for determining the pouch strength using the Instron Universal Materials Testing instrument (Instron Industrial Products, 825 University Ave., Norwood, Mass. 02062-2643) with a load cell of maximum 100 kN (kilo Newton). Via compression of a pouch, this method determines the overall strength (in Newtons) of the pouch by putting pressure on the film and seal regions. Pouch strength (in Newtons) is defined as the maximum load a pouch can support before it breaks.

The pouch strength is measured no sooner than one hour after pouch production so that the film/pouches have time to set after converting. The method is performed in a room environment between 40-50% relative humidity (RH) and 22-24° C. Stored pouches are allowed to re-equilibrate to the testing room environment for one hour prior to testing.

Figure 3:
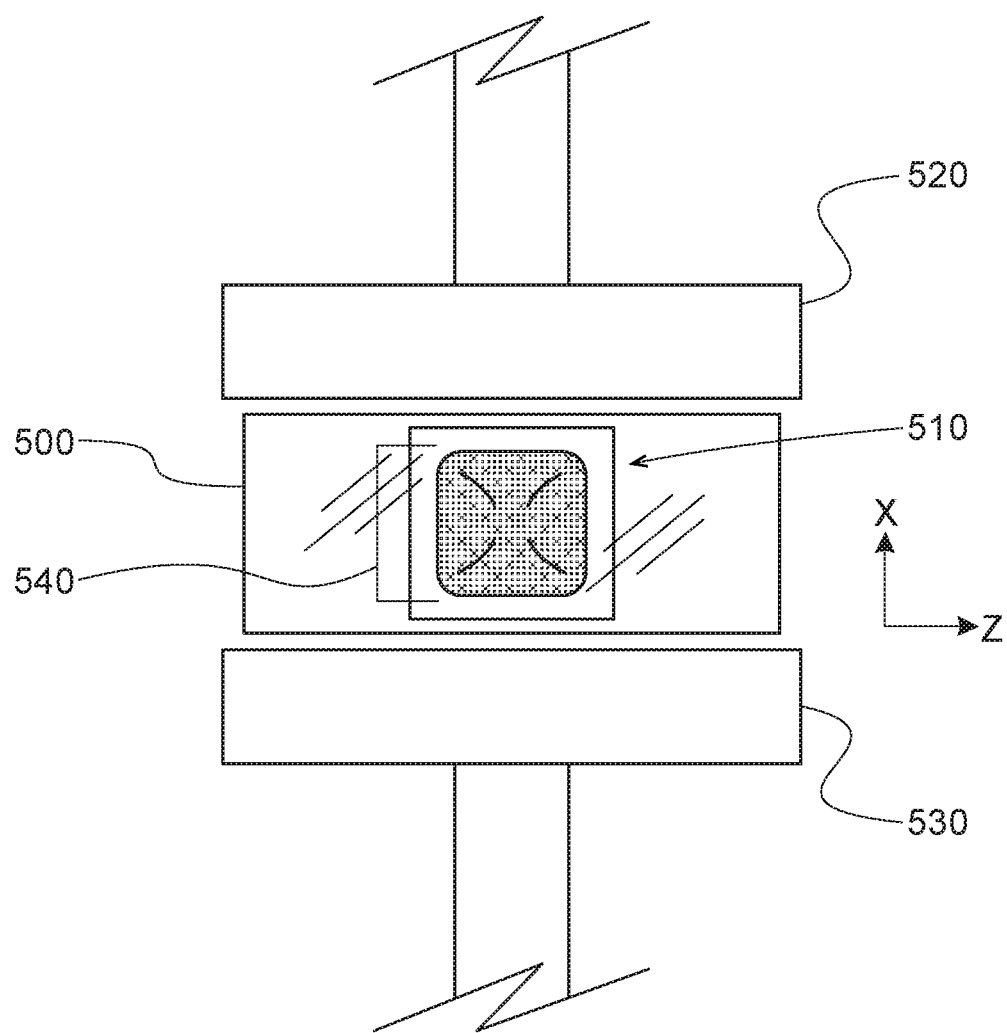
FIG. 3 shows a schematic illustration of a portion of the apparatus used in the pouch strength test method.

FIG. 3 shows a schematic illustration of the basic configuration of the pouch strength test. To measure pouch strength, a pouch 510 is enclosed in a plastic de-aerated bag 500 (150 mm by 124 mm with closure, 60 micron thick—e.g. Raja grip RGP6B) to prevent contamination of working environment upon pouch rupture. After enclosure in the bag, the pouch 510 is centered between two compression plates 520, 530 of the instrument. The pouch 510 is placed in an upright position, so that the width seal dimension 540 (43 mm in actual pouches tested) is between the compression plates such that the stress will be applied on the width seal. For the compression, the speed of the plate 520, 530 is set at 60 mm/min. Upon pouch failure, the instrument automatically records the pouch strength value (i.e., force at which the pouch fails). Ten replicates are conducted per test leg, and average pouch strength data are reported.

The pouches according to the disclosure can be marked by average pouch strength values of at least about 200 N, or at least about 250N, when measured under one or more of the following conditions: (a) one hour post-production (fresh values—stored between 40-50% RH and 22-24° C.); (b) after storage for four weeks at 20° C. (40-50% RH); and/or (c) after storage for four weeks at 32° C. (80% RH). A population of pouches according to the present disclosure may include no more than 1%, or no more than 5%, or no more than 10%, or no more than 20%, or no more than 25%, or no more than 40%, or no more than 50% of the population having a pouch strength of less than about 200 N, or less than about 250 N, when pouch strength is measured under one or more of the following conditions: (a) one hour post-production (fresh values—stored between 40-50% RH and 22-24° C.); (b) after storage for four weeks at 20° C. (40-50% RH); and/or (c) after storage for four weeks at 32° C. (80% RH).

EXAMPLES

The following examples are intended to be illustrative in nature and non-limiting.

Example 1—Pouch Strength Data

Data regarding pouch strength was collected according to the pouch strength test method described above. The particular pouches, household care compositions, and films are described in more detail below.

Water Soluble Pouches:

Multi-compartment water soluble pouches of the same shape as Ariel 3-in-1 Pods product from The Procter & Gamble Company, as commercially available in the UK in April 2016, were made on a one lane converter through thermo-vacuum forming, which included pre-heating a first water soluble film (described below) to 120° C., followed by drawing the first film into a cavity with vacuum (220 mbar). The bottom compartments were filled with the liquid detergent described below, and the filled compartments were consequently closed through solvent sealing by applying water on the bottom film of separately prepared top compartments. Top compartments were prepared on a rotary drum by drawing a preheated (120° C.) second water soluble film into a cavity through vacuum (220 mbar), filling the compartments, and closing the filled open top compartments with a third water soluble film through solvent sealing with water. The third water soluble film ends up as the middle film in the final superposed multi-compartment pouch product. Material pre-conditioning (at least 1 hour) and pouch making was performed in a room environment between 35% RH and 22-24° C.

Different pouch-forming cavities were used to form the pouches using Film 1 and Film 2, respectively, described below. The cavity used to thermoform Film 1 was about 20 mm deep, and the cavity used to thermoform Film 2 was about 15 mm deep; the footprints of the respective pouches were the same (41×43 mm). Due to the differences in cavity depth, the volumes of the bottom compartments of the resulting pouches were different. About 25 mL of liquid detergent were added to the pouch made of Film 1, and about 15 mL of liquid detergent were added to the bottom compartment of the pouch made from Film 2.

Household Care Composition:

The compartments were filled with a representative liquid multi-compartment unit dose laundry detergent composition, as commercially available in Ariel 3-in-1 Pods product from The Procter & Gamble Company, as marketed in the UK in April 2016.

Water Soluble Film:

Two different water soluble films were tested, as described in Table A. The films each included a PVOH resin blend, where the blend includes an anionic PVOH copolymer and a PVOH homopolymer as described below. The films further included film adjuncts, such as plasticizers. "4% viscosity" is determined as described herein and is related to the molecular weight of the polymer. "DH" refers to the degree of hydrolysis as described herein.

TABLE A

| | Resin content in film | Blend ratio (wt % in PVOH blend) | PVOH homopolymer | | Anionic PVOH copolymer (PVOH/PVAc/anionic monomer) | | |
|---|---|---|---|---|---|---|---|
| | | | 4% viscosity | DH (%) | Anionic source | Anionic substitution | DH | 4% viscosity |
| Film 1 | 65% | 50/50 | 13 cps | 88% | Monomethyl maleate (carboxylated) | 4% | 90% | 16 cps |
| Film 2 (comparative) | 65% | 50/50 | 13 cps | 88% | AMPS* (sulphonated) | 4% | 96% | 12 cps |

*acrylamido methylpropanesulfonic acid (sodium salt) comonomer

Test Results:

Pouch strength was tested for pouches made from Film 1 and Film 2 at the following intervals: (a) one hour post-production (fresh values—stored between 40-50% RH and 22-24° C.); (b) after storage for four weeks at 20° C. (40-50% RH); and (c) after storage for four weeks at 32° C. (80% RH). Table B shows the average pouch strength under each condition. Table C shows the relative percentage of pouches showing a pouch strength of less than 200N after storage for four weeks at 32° C. (80% RH); a pouch strength of less than 200N is considered a failure.

TABLE B

| | Pouch strength (fresh) | Pouch strength (4 weeks 20° C.) | Pouch strength (4 weeks 32° C.) |
|---|---|---|---|
| Pouch made from Film 1: | 551 N | 462 N | 224 N |
| Pouch made from Film 2 (comparative example): | 563 N | 386 N | 148 N |

TABLE C

| | Pouch strength: % pouches <200 N (4 weeks 32° C.) |
|---|---|
| Pouch made from Film 1: | 0 |
| Pouch made from Film 2 (comparative example): | 60 |

The data show that pouches made from Film 1, which included a carboxylated anionic PVOH copolymer in the PVOH resin blend, maintain better pouch strength upon ageing compared to pouches made with Film 2 (the comparative film), which included a sulfonated anionic PVOH copolymer in the PVOH resin blend. For example, the pouches made from Film 1 resulted in no pouches failing the pouch strength threshold of 200N upon ageing, set to maintain pouch integrity under typical in market pouch exposure conditions.

As described above, the pouches with carboxylate- and sulfonate-comprising films were different in depth of the bottom compartment. Notably, however, and without wishing to be bound by theory, stronger pouches were to be expected for the pouches made from the sulphonate-based film (i.e., comparative Film 2) due to less film deformation and therefore less film-thinning that occurs during the pouch-making process. Therefore, it is believed that the demonstrated pouch strength differences between the two different anionic chemistry types would have been even greater if equal cavity depths had been selected.

Example 2—Sample Resin Blends, and Films and Pouches Made Therefrom

Table 1 lists several exemplary PVOH polymer resins (A-J) that may be used to make PVOH films.

TABLE 1

| | Polymer Description |
|---|---|
| A | Anionic PVOH copolymer with monomethylmaleate* monomer unit (3% substitution; 88% degree of hydrolysis; 20 cps) |
| B | Anionic PVOH copolymer with monomethylmaleate* monomer unit (3.5% substitution; 85% degree of hydrolysis; 18 cps) |
| C | Anionic PVOH copolymer with monomethylmaleate* monomer unit (4% substitution; 86% degree of hydrolysis; 16 cps) |
| D | Anionic PVOH copolymer with monomethylmaleate* monomer unit (4.5% substitution; 92% degree of hydrolysis; 13 cps) |
| E | Anionic PVOH copolymer with monomethylmaleate* monomer unit (5% substitution; 90% degree of hydrolysis; 23 cps) |
| F | PVOH homopolymer (88% degree of hydrolysis; 13 cps) |
| G | PVOH homopolymer (88% degree of hydrolysis; 18 cps) |
| H | PVOH homopolymer (88% degree of hydrolysis; 23 cps) |
| I | PVOH homopolymer (86% degree of hydrolysis; 20 cps) |
| J | PVOH homopolymer (92% degree of hydrolysis; 20 cps) |

*sodium salt

Table 2 shows various PVOH polymer blends (#1-20) that can be made from the polymers listed of Table 1. The blends are listed by the relative weight % of each polymer in each PVOH blend. The PVOH resin blends can be used with other film adjuncts (plasticizers, etc.) to make water-soluble films. Such films can be used to form a pouch that contains a household care composition, such as a laundry detergent. The pouches may be single compartment or multi-compartment pouches.

TABLE 2

| PVOH Blend | Polymer (by wt % in PVOH blend) | | | | | | | | | |
|---|---|---|---|---|---|---|---|---|---|---|
| | Anionic PVOH copolymers | | | | | PVOH homopolymers | | | | |
| | A | B | C | D | E | F | G | H | I | J |
| 1 | 50 | | | | | 50 | | | | |
| 2 | | 40 | | | | | 60 | | | |
| 3 | | | 40 | | | | 60 | | | |
| 4 | | 35 | | | | 65 | | | | |
| 5 | | | | 45 | | | | | 55 | |
| 6 | | | | | 20 | | | | | 80 |
| 7 | | | 30 | | | | | 70 | | |
| 8 | 40 | | | | | | 60 | | | |
| 9 | | 45 | | | | | | | 55 | |
| 10 | | | 50 | | | | | | | 50 |
| 11 | | | | | 30 | 70 | | | | |
| 12 | | 40 | | | | | 60 | | | |
| 13 | 30 | | | | | | | 70 | | |
| 14 | 10 | | | | | | 90 | | | |
| 15 | | | 20 | | | | | 80 | | |
| 16 | | | | 25 | | 75 | | | | |
| 17 | | | | 25 | | | | | | 75 |
| 18 | | 50 | | | | 50 | | | | |
| 19 | | | | | 30 | | | 70 | | |
| 20 | | | 50 | | | | | | | 50 |

Example 3—Pouches Containing Household Care Compositions

Single compartment pouches and/or multi-compartment pouches may be formed from any of the films described in Example 2 (e.g., films including any of PVOH Blends 1-20). The pouches may contain household care compositions according to the following formulations.

A bleach additive composition can include the ingredients presented in Table 3.

TABLE 3

| | A Wt. % |
|---|---|
| Sodium Percarbonate | 25 |
| Bleach activator[1] | 7 |
| Sodium Carbonate | 15 |
| Sodium Citrate | 10 |
| Zeolite | 10 |
| Sodium Sulfate | 15 |
| Enzymes | 2 |
| Optical brighteners | 2 |
| Miscellaneous | To 100 |

[1]Tetraacetyl ethylene diamine

Granular laundry detergents can include the ingredients presented in Table 4.

TABLE 4

| | B (wt %) | C (wt %) | D (wt %) | E (wt %) | F (wt %) | G (wt %) |
|---|---|---|---|---|---|---|
| Linear alkylbenzenesulfonate | 8 | 7.1 | 7 | 6.5 | 7.5 | 7.5 |
| AE3S | 0 | 4.8 | 0 | 5.2 | 4 | 4 |
| C12-14 Alkylsulfate | 1 | 0 | 1 | 0 | 0 | 0 |
| AE7 | 2.2 | 0 | 3.2 | 0 | 0 | 0 |

TABLE 4-continued

| | B (wt %) | C (wt %) | D (wt %) | E (wt %) | F (wt %) | G (wt %) |
|---|---|---|---|---|---|---|
| $C_{10-12}$ Dimethyl hydroxyethylammonium chloride | 0.75 | 0.94 | 0.98 | 0.98 | 0 | 0 |
| Crystalline layered silicate (d-$Na_2Si_2O_5$) | 4.1 | 0 | 4.8 | 0 | 0 | 0 |
| Zeolite A | 5 | 0 | 5 | 0 | 2 | 2 |
| Citric Acid | 3 | 5 | 3 | 4 | 2.5 | 3 |
| Sodium Carbonate | 15 | 20 | 14 | 20 | 23 | 23 |
| Silicate 2R ($SiO_2:Na_2O$ at ratio 2:1) | 0.08 | 0 | 0.11 | 0 | 0 | 0 |
| Soil release agent | 0.75 | 0.72 | 0.71 | 0.72 | 0 | 0 |
| Acrylic Acid/Maleic Acid Copolymer | 1.1 | 3.7 | 1.0 | 3.7 | 2.6 | 3.8 |
| Carboxymethylcellulose | 0.15 | 1.4 | 0.2 | 1.4 | 1 | 0.5 |
| Protease - Purafect ® (84 mg active/g) | 0.2 | 0.2 | 0.3 | 0.15 | 0.12 | 0.13 |
| Amylase - Stainzyme Plus ® (20 mg active/g) | 0.2 | 0.15 | 0.2 | 0.3 | 0.15 | 0.15 |
| Lipase - Lipex ® (18.00 mg active/g) | 0.05 | 0.15 | 0.1 | 0 | 0 | 0 |
| Amylase - Natalase ® (8.65 mg active/g) | 0.1 | 0.2 | 0 | 0 | 0.15 | 0.15 |
| Cellulase - Celluclean ™ (15.6 mg active/g) | 0 | 0 | 0 | 0 | 0.1 | 0.1 |
| TAED | 3.6 | 4.0 | 3.6 | 4.0 | 2.2 | 1.4 |
| Percarbonate | 13 | 13.2 | 13 | 13.2 | 16 | 14 |
| Na salt of Ethylenediamine-N,N'-disuccinic acid, (S,S) isomer (EDDS) | 0.2 | 0.2 | 0.2 | 0.2 | 0.2 | 0.2 |
| Hydroxyethane di phosphonate (HEDP) | 0.2 | 0.2 | 0.2 | 0.2 | 0.2 | 0.2 |
| $MgSO_4$ | 0.42 | 0.42 | 0.42 | 0.42 | 0.4 | 0.4 |
| Perfume | 0.5 | 0.6 | 0.5 | 0.6 | 0.6 | 0.6 |
| Suds suppressor agglomerate | 0.05 | 0.1 | 0.05 | 0.1 | 0.06 | 0.05 |
| Soap | 0.45 | 0.45 | 0.45 | 0.45 | 0 | 0 |
| Sulphonated zinc phthalocyanine (active) | 0.0007 | 0.0012 | 0.0007 | 0 | 0 | 0 |
| S-ACMC | 0.01 | 0.01 | 0 | 0.01 | 0 | 0 |
| Direct Violet 9 (active) | 0 | 0 | 0.0001 | 0.0001 | 0 | 0 |
| Sulfate/Water & Miscellaneous | | | Balance to 100 | | | |

Liquid laundry detergents can include the ingredients presented in Table 5.

TABLE 5

| | H Wt. % | I Wt. % | J Wt. % | K Wt. % | L Wt. % | M Wt. % |
|---|---|---|---|---|---|---|
| Glycerol | 3 | 5 | 6.1 | 0.6 | 5 | 5.3 |
| 1,2 Propanediol | 16 | 14 | 15.9 | | 12 | 10 |
| Citric acid | 1 | | 1.2 | | 0.5 | 0.5 |
| Isopropanol | | | | 7.7 | | |
| NaOH | 0.5 | | | | 1 | |
| Marlipal $C_{12-14}EO_7$ | 22 | | 11.8 | | 14 | 20.1 |
| $C_{13-15}EO_9$ | 1 | 15 | | | | |
| $C_{9-11}EO_9$ | | | | 72 | | |
| Linear alkyl benzene sulfonic acid[1] | 16 | 25 | 14.5 | | 23 | 24.6 |
| $C_{12-18}$ Fatty acid | 16 | 5 | 12.5 | | 6 | 16.4 |
| $C_{12-14}$ alkyl ethoxy 3 sulfate | | | 11.1 | | 9 | |
| Enzymes | 2.5 | 1.5 | 1.3 | 2.0 | 1.5 | 2.0 |
| Polyethyleneimine ethoxylate PEI 600 E20 | 2 | | 5.0 | | | 3.0 |
| Diethylenetriamine Pentaacetic Acid | | 0.9 | | | 1 | |
| Dequest 2010 | 1.5 | | | | 1 | 1.1 |
| Optical brightening agent | 1 | 1.2 | 2.5 | 0.5 | | 0.2 |
| Mg $Cl_2$ | | | 0.7 | | | 0.2 |
| Potassium sulfite | | | 0.5 | | 0.35 | 0.2 |
| Structurant | | 0.21 | 0.13 | | 0.15 | |
| Silicone softening agent (PDMS) | | | | | | 2.5 |
| Water | 8 | 10 | 7 | 6 | 9 | |
| Miscellaneous (dyes, aesthetics, perfume etc) | To 100 | To 100 | To 100 | To 100 | To 100 | To 100 |
| Monoethanol amine | To pH 7.6 | To pH 7.5 | To pH 7.4 | To pH 7.6 | To pH 7.6 | To pH 7.6 |

[1] Preferred LAS also comprise an alkyl group comprising from about 9 to about 15 carbon atoms, in straight chain configuration.

The detergents can include the formulation presented in Table 6.

TABLE 6

|  | N Wt. % |
|---|---|
| Dimethyl monoethyl ether | 73.87 |
| Sodium lauryl sulfate | 6.00 |
| Dimethyl glyoxime | 1.00 |
| Isopropyl alcohol | 0.5 |
| Triazine stilbene (Tinopal UNPA-GX) | 0.4 |
| Monoethanol amine | 1.52 |
| Linear alcohol ethoxylate (Surfonic LF-17) | 13.61 |
| d-limonene | 3.00 |

The household care composition can include either of the formulations presented in Table 7.

TABLE 7

|  | O Wt. % | P Wt. % |
|---|---|---|
| Cationic Softener Active[1] | 65.0 | 65.0 |
| Fatty Acid[2] | 1.8 | 1.8 |
| TMPD[3] | 14.7 | 14.7 |
| Cocoamide 6EO[4] | 4.05 | 4.05 |
| Perfume | 5 | 2.5 |
| Perfume Microcapsules | — | 1.25 |
| Dye | 0.001 | 0.001 |
| Hexylene Glycol[6] | 5.63 | 5.6 |
| Ethanol[6] | 5.63 | 5.6 |

[1]Di(acyloxyethyl)(2-hydroxy ethyl) methyl ammonium methyl sulfate wherein the acyl group is derived from partially hydrogenated canola fatty acid.
[2]Partially hydrogenated canola fatty acid.
[3]2,2,4-trimethyl-1,3-pentanediol
[4]PEG 6 cocamide - polyethylene glycol amide of coconut fatty acid.
[5]Sodium salt of hydroxyethane diphosphonic acid
[6]Material included with softening active by supplier.

Multi-compartment pouches can contain a plurality of benefit agents. By way of a non-limiting example, a two- or three-component pouch may contain the formulations presented in Table 8 in separate enclosures, where dosage is the amount of the formulation in the respective enclosure.

TABLE 8

|  | Q 3 compartments | | | R 2 compartments | | S 3 compartments | | |
|---|---|---|---|---|---|---|---|---|
|  | \multicolumn{8}{c}{Compartment #} |
|  | 1 | 2 | 3 | 1 | 2 | 1 | 2 | 3 |
|  | \multicolumn{8}{c}{Dosage (g)} |
|  | 34.0 | 3.5 | 3.5 | 30.0 | 5.0 | 25.0 | 1.5 | 4.0 |
| Ingredients | \multicolumn{8}{c}{Weight %} |
| Alkylbenzene sulfonic acid | 20.0 | 20.0 | 20.0 | 10.0 | 20.0 | 20.0 |  |  |
| Alkyl sulfate |  |  |  | 2.0 |  |  |  |  |
| C12-14 alkyl 7-ethoxylate | 17.0 | 17.0 | 17.0 |  | 17.0 | 17.0 |  |  |
| Cationic surfactant |  |  |  | 1.0 |  |  |  |  |
| Zeolite A |  |  |  | 10.0 |  |  |  |  |
| C12-18 Fatty acid | 13.0 | 13.0 | 13.0 |  | 18.0 | 18.0 |  |  |
| Sodium acetate |  |  |  | 4.0 |  |  |  |  |
| enzymes | 0-3 | 0-3 | 0-3 | 0-3 |  | 0-3 |  |  |
| Sodium Percarbonate |  |  |  | 11.0 |  |  |  |  |
| TAED |  |  |  | 4.0 |  |  |  |  |
| Organic catalyst [1] |  |  |  | 1.0 |  |  |  |  |
| PAP granule [2] |  |  |  |  |  |  |  | 50 |
| Polycarboxylate |  |  |  | 1.0 |  |  |  |  |
| Polyethyleneimine ethoxylate [3] | 2.2 | 2.2 | 2.2 |  |  |  |  |  |
| Hydroxyethane diphosphonic acid | 0.6 | 0.6 | 0.6 | 0.5 |  |  |  |  |
| Ethylene diamine tetra(methylene phosphonic) acid |  |  |  |  |  | 0.4 |  |  |
| Brightener | 0.2 | 0.2 | 0.2 | 0.3 |  | 0.3 |  |  |
| Mineral oil |  |  |  |  |  |  |  |  |
| Hueing dye [4] |  |  | 0.05 |  | 0.035 |  | 0.12 |  |
| Perfume | 1.7 | 1.7 | 0.6 |  |  | 1.5 |  |  |
| Water and minors (antioxidant, aesthetics, etc.) | 10.0 | 10.0 | 10.0 | 4.0 |  |  |  |  |
| Buffers (sodium carbonate, monoethanolamine) [5] | \multicolumn{8}{c}{To pH 8.0 for liquids To RA > 5.0 for powders} |
| Solvents (1,2 propanediol, ethanol) for liquids, sodium sulfate for powders | \multicolumn{8}{c}{To 100%} |

[1] Sulfuric acid mono-[2-(3,4-dihydro-isoquinolin-2-yl)-1-(2-ethyl-hexyloxymethyl)-ethyl]ester as described in U.S. Pat. No. 7,169,744
[2] PAP = Phtaloyl-Amino-Peroxycaproic acid, as a 70% active wet cake
[3] Polyethylenimine (MW = 600) with 20 ethoxylate groups per —NH.
[4] Ethoxylated thiophene, EO ($R_1 + R_2$) = 5
[5] RA = Reserve Alkalinity (g NaOH/dose)

In another embodiment of multicomponent pouches, the respective enclosures can be filled with liquid and solid benefit agents. Non-limiting examples of two compartment pouches, where one enclosure is filled with a liquid and one is filled with a solid, include combinations of the formulations presented in Tables 9A and 9B.

TABLE 9A

|  | T | U | V | W |
|---|---|---|---|---|
| Liquid formulation | XL1 | XL2 | XL3 | XL4 |
| dosage | 10 g | 5 g | 15 g | 7 g |
|  | Wt % | Wt % | Wt % | Wt % |
| Marlipal C24-7 | 74 |  | 20 | 14 |
| Non ionic surfactant Neodol 23-5 |  | 55 |  |  |
| Anionic surfactant[1] |  | 20 | 20 | 25 |
| Propane diol | 10 | 4 | 22 | 10 |
| Glycerol | 2 | 5 | 5 |  |
| Soil dispersant[2] |  | 2 |  |  |
| Amphiphilic alkoxylated grease cleaning polymer[3] |  |  | 5 |  |
| Fatty acid |  |  | 10 | 20 |
| Enzymes |  |  |  | 3 |
| Structurant |  |  | 3 |  |
| Perfume | 7 | 10 |  |  |
| Water | 2 | 3 | 5 |  |
| Monoethanol amine |  | To pH 7.5 |  |  |
| Minors |  | To 100% |  |  |

[1]Linear C11-13 alkyl benzene sulfonic acid
[2]$(bis(C_2H_5O)(C_2H_4O)_n/(CH_3)-N^+-C_xH_{2x}-N^+-(CH_3)-bis((C_2H_5O)(C_2H_4O)_n))$, wherein n = from 15 to 30, and x = from 3 to 8.
[3]Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

TABLE 9B

|  | X | Y | Z | AA |
|---|---|---|---|---|
| Powder formulation | XP1 | XP2 | XP3 | XP4 |
| Dosage | 35 g | 25 g | 40 g | 30 g |
|  | Wt % | Wt % | Wt % | Wt % |
| Anionic surfactant |  | 20 | 20 | 20 |
| Cationic surfactant |  |  | 1.5 | 1.5 |
| Bleach agent | 20 | 36 | 36 | 36 |
| Chelating agent | 0.8 | 2 | 2 | 2 |
| Enzyme |  | 10 | 10 | 10 |
| Sodium carbonate |  | 6 | 4 | 4 |
| Sodium bicarbonate |  |  | 4 | 4 |
| Zeolite | 40 | 20 | 15 | 15 |
| Fluorescent whitening agent | 0.5 | 3 |  | 1 |
| Polymers | 2 |  | 5 | 5 |
| Sodium sulfate | 15 |  |  |  |
| Minors | To 100% |  |  |  |

A hard surface cleaning composition, which may be used by professionals, can include the formulation presented in Table 10.

TABLE 10

| Ingredient Name | AB WT % |
|---|---|
| C10 alkyl alcohol-8-ethoxylate | 55.0 |
| Linear alkylbenzene sulfonic acid | 9.0 |
| Monoethanolamine | 2.4 |
| 1,2 propanediol | 9.0 |
| Glycerol | 7.5 |
| C1218 alkyl fatty acid | 2.5 |

TABLE 10-continued

| Ingredient Name | AB WT % |
|---|---|
| Dye | 0.1 |
| Perfume | 2.2 |
| Water | Balance |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A pouch comprising a water-soluble film and a household care composition at least partially enclosed by the water-soluble film in at least one compartment,
the water-soluble film comprising a polyvinyl alcohol (PVOH) resin blend comprising:
a first PVOH polymer comprising carboxylated anionic monomer units, vinyl alcohol monomer units and optionally vinyl acetate monomer units,
wherein the carboxylated anionic monomer unit is present in the first PVOH polymer in an amount of from about 3 mol. % to about 6 mol. %, and
wherein the carboxylated anionic monomer unit is derived from monoalkyl maleate;
a second PVOH polymer consisting essentially of vinyl alcohol monomer units and optionally vinyl acetate monomer units,
wherein the second PVOH polymer is characterized by a degree of hydrolysis of from about 60% to about 99%,
wherein the first PVOH polymer is present in an amount in a range from about 30 wt. % to about 50 wt. % of total PVOH polymers in the film.

2. A pouch according to claim 1, wherein the PVOH resin blend is present in the water-soluble film in an amount in a range of about 50 wt. % to about 95 wt. %, by weight of the film.

3. A pouch according to claim 1, wherein the monoalkyl maleate unit is selected from the group consisting of monomethyl maleate, salts thereof, and combinations thereof.

4. A pouch according to claim 1, wherein the carboxylated anionic monomer unit is present in the first PVOH polymer in an amount of from about 3 mol. % to about 5 mol. %.

5. A pouch according to claim 1, wherein the carboxylated anionic monomer is present in an amount in a range of from about 0.5 mol % to about 3 mol % of total PVOH polymer in the film.

6. A pouch according to claim 1, wherein the first PVOH polymer is characterized by a 4% solution viscosity at 20° C. ($\mu_1$) of from about 10 cP to about 40 cP, or from about 10 cP to about 30 cP, or from about 12 cP to about 25 cP, or from about 14 cP to about 20 cP.

7. A pouch according to claim 1, wherein the first PVOH polymer is characterized by a degree of hydrolysis of 60% to about 99%.

8. A pouch according to claim 1, wherein the second PVOH polymer is characterized by a 4% solution viscosity at 20° C. ($\mu_2$) from about 3.0 cP to about 30 cP, or from about 7 cP to about 30 cP, or from about 10 cP to about 30 cP, or from about 12 cP to about 25 cP.

9. A pouch according to claim 8, wherein the first PVOH polymer is characterized by a 4% solution viscosity at 20° C. ($\mu_1$), and wherein an absolute viscosity difference $|\mu_2-\mu_1|$ for the first PVOH polymer and the second PVOH polymer is in a range of 0 cP to about 10 cP.

10. A pouch according to claim 1, wherein the second PVOH polymer is present in an amount in a range from about 50 wt. % to about 70 wt. % of total PVOH polymers in the film.

11. A pouch according to claim 1, wherein the PVOH resin blend comprises a third PVOH polymer.

12. A pouch according to claim 1, wherein the water-soluble film further comprises at least a third water-soluble polymer which is other than a PVOH polymer.

13. A pouch according to claim 12, wherein the third water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, blends thereof, and combinations thereof.

14. A pouch according to claim 1, wherein the water-soluble film further comprises a component selected from the group consisting of plasticizers, plasticizer compatibilizers, lubricants, release agents, fillers, extenders, crosslinking agents, antiblocking agents, antioxidants, detackifying agents, antifoams, nanoparticles, bleaching agents, surfactants, and combinations thereof.

15. A pouch according to claim 1, wherein the water-soluble film further comprises one or more plasticizers in an amount in a range of about 1 wt. % to about 40 wt. % of the film.

16. A pouch according to claim 1, wherein the film comprises an aversive agent.

17. A pouch according to claim 1, wherein the film has an undeformed thickness of from about 5 to about 200 μm, or from about 20 to about 100 μm, or from about 40 to about 85 μm, or about 76 μm.

18. A pouch according to claim 1, wherein the pouch further comprises at least two compartments, or at least three compartments.

19. A pouch according to claim 18, wherein a second compartment is superposed on a first compartment.

20. A pouch according to claim 1, wherein the household care composition is selected from the group consisting of light duty liquid detergents compositions, heavy duty liquid detergent compositions, hard surface cleaning compositions, laundry detergent gels, bleaching compositions, laundry additives, fabric enhancer compositions, shampoos, body washes, and mixtures thereof.

21. A pouch according to claim 1, wherein the composition is in the form of a liquid.

22. A pouch comprising a water-soluble film and a household care composition at least partially enclosed by the water-soluble film in at least one compartment,
the water-soluble film comprising a polyvinyl alcohol (PVOH) resin blend comprising:
a first PVOH polymer comprising carboxylated anionic monomer units, vinyl alcohol monomer units and optionally vinyl acetate monomer units,
wherein the carboxylated anionic monomer unit is derived from monoalkyl maleate,
wherein the first PVOH polymer is present in an amount in a range from about 30 wt. % to about 50 wt. % of total PVOH polymers in the film,
wherein the carboxylated anionic monomer unit is present in the film in an amount in a range of from about 0.5 mol % to about 3 mol % of total PVOH polymer in the film, and
a second PVOH polymer consisting essentially of vinyl alcohol monomer units and optionally vinyl acetate monomer units.

23. A pouch according to claim 22, wherein the composition is a liquid.

24. A pouch according to claim 22, wherein the household care composition is selected from the group consisting of light duty liquid detergents compositions, heavy duty liquid detergent compositions, hard surface cleaning compositions, laundry detergent gels, bleaching compositions, laundry additives, fabric enhancer compositions, shampoos, body washes, other personal care compositions, and mixtures thereof.

25. A method of forming a pouch according to claim 1, the method comprising the steps of:
providing the water-soluble film;
shaping the film to form an open compartment;
providing the composition to the open compartment;
sealing the open compartment to form a pouch having a sealed compartment having the
composition enclosed therein.

26. A method according to claim 25, wherein the open compartment is sealed with at least a second sealed compartment, so that the pouch formed by the method is a multi-compartment pouch having superposed compartments.

27. A method of treating a substrate, where the method includes the step of combining the pouch according to claim 1 with water, allowing for at least some of the film of the pouch to dissolve in the presence of the water, diluting the composition contained therein 300-800 fold with water to form a wash liquor, and contacting the substrate with the wash liquor.

* * * * *